(12) United States Patent
Qiang et al.

(10) Patent No.: US 11,870,680 B2
(45) Date of Patent: Jan. 9, 2024

(54) COMMUNICATION METHOD AND APPARATUS

(71) Applicant: HUAWEI TECHNOLOGIES CO., LTD., Shenzhen (CN)

(72) Inventors: Li Qiang, Beijing (CN); Fang Yu, Shenzhen (CN); Xiangdong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/986,557

(22) Filed: Nov. 14, 2022

(65) Prior Publication Data

US 2023/0075078 A1 Mar. 9, 2023

Related U.S. Application Data

(63) Continuation of application No. PCT/CN2021/088685, filed on Apr. 21, 2021.

(30) Foreign Application Priority Data

May 14, 2020 (CN) .......................... 202010406404.6

(51) Int. Cl.
*H04L 45/121* (2022.01)
*H04L 45/42* (2022.01)
*H04L 45/00* (2022.01)

(52) U.S. Cl.
CPC ............ *H04L 45/121* (2013.01); *H04L 45/42* (2013.01); *H04L 45/566* (2013.01)

(58) Field of Classification Search
CPC ....... H04L 45/121; H04L 45/42; H04L 45/66; H04L 47/28; H04L 47/2416;
(Continued)

(56) References Cited

U.S. PATENT DOCUMENTS 11,051,321 B2 * 6/2021 Moon ................. H04W 72/535
11,516,078 B2 * 11/2022 Moon ................. H04W 56/001
(Continued)

FOREIGN PATENT DOCUMENTS

CN 109672510 A 4/2019
CN 110366258 A 10/2019

OTHER PUBLICATIONS

"Addressing Editor's notes on TSN," 3GPP TSG-SA2 Meeting #132, S2-1904620, Xi'an, P.R. China, Total 11 pages, 3rd Generation Partnership Project, Valbonne, France (Apr. 8-12, 2019).
(Continued)

*Primary Examiner* — Sargon N Nano
(74) *Attorney, Agent, or Firm* — Leydig, Voit & Mayer, Ltd.

(57) ABSTRACT

A communication method and apparatus are provided for transmitting packets of a data stream between user equipment. After receiving a first packet from a first user equipment, a user plane function (UPF) forwards the first packet to a second user equipment at a first moment, so that the first packet that arrives at the UPF before the first moment is not forwarded to the second user equipment until the first moment, to support deterministic sending and ensure that a time sensitive communication (TSC) packet is sent at a determined moment, so as to provide deterministic delay assurance for applications such as industrial control and telemedicine.

16 Claims, 11 Drawing Sheets

(58) Field of Classification Search
CPC ..... H04L 47/724; H04L 47/80; H04L 45/666; H04W 72/04; H04W 56/00; H04W 72/21
See application file for complete search history.

(56) References Cited

U.S. PATENT DOCUMENTS

| | | | |
|---|---|---|---|
| 11,516,134 B2* | 11/2022 | Li | H04L 47/193 |
| 11,546,805 B2* | 1/2023 | Prabhakar | H04L 43/0852 |
| 11,627,493 B2* | 4/2023 | Rost | H04W 28/10 370/229 |
| 2014/0247839 A1 | 9/2014 | Kingsley | |
| 2019/0090257 A1* | 3/2019 | Han | H04W 28/24 |
| 2019/0159227 A1* | 5/2019 | Talebi Fard | H04W 76/00 |
| 2020/0259896 A1* | 8/2020 | Sachs | H04J 3/0667 |
| 2020/0351752 A1* | 11/2020 | Sivasiva Ganesan | H04W 40/246 |

OTHER PUBLICATIONS

"3rd Generation Partnership Project; Technical Specification Group Services and System Aspects; System Architecture for the 5G System (5GS); Stage 2 (Release 16)," 3GPP TS 23.501 V16.2.0, pp. 1-391, 3rd Generation Partnership Project, Valbonne, France (Sep. 2019).

"Resoving the EN on traffic patern to the TT," 3GPP TSG-SA WG2 Meeting #133, S2-1905524, Reno, US, Total 3 pages, 3rd Generation Partnership Project, Valbonne, France (May 13-17, 2019).

"3rd Generation Partnership Project; Technical Specification Group Services and System Aspects; Study on enhanced support of Industrial Internet of Things (IIoT) in 5G System (Release 17)," 3GPP TR 23.700-20 V0.3.0, pp. 1-33, 3rd Generation Partnership Project, Valbonne, France (Jan. 2020).

"Vertical_LAN TSN related CR for non-FASMO corrections," SA WG2 Meeting #137E, S2-2002570, Elbonia, Total 22 pages, 3rd Generation Partnership Project, Valbonne, France (Feb. 24-27, 2020).

JP/2022567733, Office Action, dated Sep. 6, 2023.

Samsung, "Solution for UE-to-UE TSC," 3GPP TSG SA WG2#136 S2-1912396, Total 7 pages, 3rd Generation Partnership Project, Valbonne, France (Nov. 22, 2019).

Ericsson, "TSCAI arrival time analysis," 3GPP TSG SA WG2#133, S2-1904935, Total 6 pages, 3rd Generation Partnership Project, Valbonne, France (May 7, 2019).

Zte et al., "Resolving the EN on traffic pattern to the TT," 3GPP TSG SA WG2#133, Reno, US, S2-1905524, Total 5 pages, 3rd Generation Partnership Project, Valbonne, France (May 13-17, 2019).

Ericsson, "Applying IEEE 802.1Q Per-Stream Filtering and Policing information for RAN scheduling optimization," 3GPP TSG SA WG2#135, Split, Croatia, S2-1909405, Total 6 pages, 3rd Generation Partnership Project, Valbonne, France (Oct. 2019).

Huawei et al., "QoS Negotiation between 3GPP and TSN networks KI#3.1," 3GPP TSG SA WG2#129, Dongguan, China, S2-1810475 (reference for showing well-known technology), Total 12 pages, 3rd Generation Partnership Project, Valbonne, France (Oct. 2018).

Intel Corporation, "TSC assistance information," 3GPP TSG RAN WG2#108, Reno, Nevada, R2-1915741 (reference for showing well-known technology), Total 5 pages, 3rd Generation Partnership Project, Valbonne, France (Nov. 2019).

Nokia et al., "Analysis of TSCAI derivation Solution options," 3GPP TSG SA WG2#136AH S2-2000665 (reference for showing well-known technology), Total 14 pages, 3rd Generation partnership Project, Valbonne, France (Jan. 7, 2020).

NTT Docomo et al., "UPF reporting the time comparison," 3GPP TSG SA WG2#135, Split, Croatia, S2-1908786, Total 29 pages, 3rd Generation Partnership Project, Valbonne, France (Oct. 2019).

* cited by examiner

Burst arrival time     A packet enters the 5GS

A packet enters the 5GS    Burst arrival time

COMMUNICATION METHOD AND APPARATUS

CROSS-REFERENCE TO RELATED APPLICATIONS

This application is a continuation of International Application No. PCT/CN2021/088685, filed on Apr. 21, 2021, which claims priority to Chinese Patent Application No. 202010406404.6, filed on May 14, 2020. The disclosures of the aforementioned applications are hereby incorporated by reference in their entireties.

TECHNICAL FIELD

This application relates to the field of communication technologies, and in particular, to a communication method and apparatus.

BACKGROUND

Currently, in a 3GPP time sensitive network (TSN) subject, an entire 5G system (5GS) is considered as a virtual TSN bridge. A functional module, namely a device side TSN translator (DS-TT), is stacked on user equipment (UE), and a functional module, namely a network side TSN translator (NW-TT), is stacked on a user plane function (UPF), so that the 5GS adapts to an external TSN system.

When data is transmitted between the 5GS and the external TSN system, the DS-TT or NW-TT may allow, according to a hold & forward buffering mechanism, a time sensitive communication (TSC) packet that arrives at UE or a UPF in advance to wait until predetermined time before being sent out of the 5GS, to ensure deterministic forwarding of the TSC packet or a burst.

However, when a TSN packet is transmitted in the 5GS, a TSN is sent by one UE to the UPF, and then forwarded by the UPF to another UE in the 5GS. In this process, the TSN packet is not forwarded through the NW-TT, and after receiving the TSN packet, the UPF immediately forwards the TSN packet. As a result, deterministic forwarding of the TSC packet cannot be ensured.

SUMMARY

This application provides a communication method and apparatus, to ensure deterministic forwarding of a TSC packet in a 5GS.

According to a first aspect, an embodiment of this application provides a communication method. The method may be performed by a UPF, or may be performed by a component (for example, a processor, a chip, or a chip system) of the UPF.

The following provides descriptions by using an example in which the method is performed by the UPF. According to the method, the UPF may receive a first packet of a first data stream from first user equipment. A transmit end of a packet of the first data stream is the first user equipment, and a receive end of the packet of the first data stream is second user equipment. In addition, the UPF may send the first packet to the second user equipment at a first moment.

In a possible design, the first moment is associated with a third moment, first duration, and second duration. The third moment is a moment at which the first packet arrives at an ingress port of the first user equipment. The first duration is residence time of the first packet on the first user equipment and a DS-TT. The second duration is a packet delay budget delay (or referred to as a packet delay budget corresponding to the first user equipment) corresponding to an uplink protocol data unit (PDU) session of the first packet. The uplink PDU session of the first packet is used to transmit the first packet to the UPF. The ingress port is a port used by the first user equipment to receive the first packet.

In another possible design, the first moment is associated with a fourth moment and second duration. The fourth moment is a moment at which the first packet arrives at an egress port of the first user equipment. The egress port is a port used by the first user equipment to send the first packet in uplink.

According to the foregoing method, after receiving the first packet from the first user equipment, the UPF may forward the first packet to the second user equipment at the first moment, so that the first packet that arrives at the UPF before the first moment is not forwarded to the second user equipment until the first moment, to support deterministic sending and ensure that a TSC packet is sent at a determined moment, so as to provide deterministic delay assurance for applications such as industrial control and telemedicine.

For example, after receiving the first packet, the UPF may send the first packet to the second UE after fourth duration (or referred to as cache duration, buffer duration, or residence time). The fourth duration is associated with a second moment, the third moment, the first duration, and the second duration. In other words, the fourth duration is determined based on the second moment, the third moment, the first duration, and the second duration. The second moment is a moment at which the UPF receives the first packet.

It should be understood that the fourth duration is duration in which the first packet needs to wait in the UPF. Alternatively, the UPF may send the first packet to the second UE at the first moment in local time.

In a possible design, the first packet may include first information. The first information indicates the third moment, or indicates the third moment and the first duration, or indicates the fifth moment. The fifth moment is associated with the third moment and the first duration. It should be understood that the fifth moment may be the moment at which the first packet arrives at the egress port of the first user equipment.

In a possible design, the UPF may further receive a per-stream filtering and policing (PSFP) parameter from a session management function (SMF). The UPF may further determine the third moment based on the PSFP parameter.

In a possible design, the UPF may receive second information from the SMF. The second information indicates the first duration and/or the third moment.

In a possible design, the first packet may include third information. The third information may indicate the first duration.

In a possible design, the UPF may receive fourth information from the SMF. The fourth information may indicate the second duration.

In a possible design, the UPF may receive fifth information from the SMF. The fifth information may indicate the third duration. The UPF may determine the first moment based on the third moment and the third duration. The third duration is a sum of the first duration and the second duration.

The fifth information may specifically indicate the UPF to determine the first moment based on the third moment and the third duration. Alternatively, the fifth information may specifically indicate that the third duration is the sum of the first duration and the second duration, for example, carry indication information, to indicate that the third duration is the sum of the first duration and the second duration, or carry the third duration by using a specific field. The field indicates the sum of the first duration and the second duration. In a possible design, the UPF may receive sixth information from an SMF. The sixth information may indicate the fourth moment.

In a possible design, the UPF receives seventh information from the SMF. The seventh information indicates a first period. The first period is a period in which the first packet is sent from the first user equipment. Alternatively, the first period is a time period between start moments of two packets (or referred to as a time interval between the start moments of the two packets). The start moment may be the moment at which the packet arrives at the egress port of the first user equipment. Specifically, the first period may indicate a time period between moments at which two consecutively sent packets separately arrive at the egress port of the first user equipment.

In a possible design, the UPF may receive time sensitive communication assistance information and fourth information from an SMF. The fourth information indicates the second duration. The time sensitive communication assistance information may indicate the fourth moment and a first period.

In a possible design, the UPF may receive eighth information from the SMF. The eighth information indicates a fifth moment. The fifth moment is associated with the third moment and the first duration. It should be understood that the fifth moment may be the moment at which the first packet arrives at the egress port of the first user equipment.

In a possible design, the UPF may receive ninth information from an SMF. The ninth information indicates the first moment. The first moment may be determined by the SMF based on the third moment, the first duration, and the second duration, or may be determined by the SMF based on the third moment and third duration, or may be determined by the SMF based on the fourth moment and the second duration.

According to a second aspect, an embodiment of this application provides a communication method. The method may be performed by first user equipment (or referred to as first UE), or may be performed by a component (for example, a processor, a chip, or a chip system) of the first UE.

The following provides descriptions by using an example in which the method is performed by the first user equipment. According to the method, the first user equipment may send a first packet to a UPF. The first packet includes first information or third information.

The first information indicates a third moment. The third moment is a moment at which the first packet arrives at an ingress port of the first user equipment. The first information indicates a third moment and first duration. The first duration is residence time of the first packet on the first user equipment and a DS-TT.

Alternatively, the first information indicates a fifth moment. The fifth moment is associated with a third moment and first duration. It should be understood that the fifth moment may be a moment at which the first packet arrives at an egress port of the first user equipment.

The third information indicates the first duration.

In a possible design, if the first information indicates the third moment, the first user equipment may send tenth information to an SMF. The tenth information indicates the first duration and/or the third moment.

In a possible design, the first user equipment may receive eleventh information from the SMF. The eleventh information includes information about a PDU session of the first packet.

In a possible design, the information about the PDU session includes at least one of a PDU session identifier, a quality of service (QoS) flow identifier (QFI), a media access control (MAC) address (for example, a source MAC address and/or a destination MAC address), or a virtual local area network identifier (VLAN ID).

According to a third aspect, an embodiment of this application provides a communication method. The method may be performed by first user equipment, or may be performed by a component (for example, a processor, a chip, or a chip system) of the first user equipment.

The following provides descriptions by using an example in which the method is performed by the first user equipment. According to the method, the first user equipment may send tenth information to an SMF. The tenth information indicates first duration and/or a third moment. The first duration is residence time of a first packet on the first user equipment and a DS-TT. The third moment is a moment at which the first packet arrives at an ingress port of the first user equipment. The first user equipment may further send the first packet to a UPF.

According to a fourth aspect, an embodiment of this application provides a communication method. The method may be performed by an SMF, or may be performed by a component (for example, a processor, a chip, or a chip system) of the SMF.

The following provides descriptions by using an example in which the method is performed by the SMF. According to the method, the SMF may send at least one of a PSFP parameter, second information, fourth information, fifth information, sixth information, seventh information, time sensitive communication assistance information, eighth information, or ninth information to a UPF.

The PSFP parameter is used to determine a third moment. The third moment is a moment at which a first packet arrives at an ingress port of first user equipment.

The second information indicates a first duration. The first duration is residence time of the first packet on the first user equipment and a DS-TT.

The fourth information indicates a second duration. The second duration is a packet delay budget corresponding to an uplink PDU session of the first packet.

The fifth information indicates a third duration. The third duration is a sum of the first duration and the second duration.

The sixth information indicates a fourth moment. The fourth moment is a moment at which the first packet arrives at an egress port of the first user equipment. The egress port is a port used by the first user equipment to send the first packet in uplink.

The seventh information indicates a first period. The first period is a period in which the first packet is sent from the first user equipment. In other words, the first period is a time period between start moments of two packets.

The eighth information indicates a fifth moment. The fifth moment is associated with the third moment and the first duration. It should be understood that the fifth moment may be the moment at which the first packet arrives at the egress port of the first user equipment.

The ninth information indicates a first moment.

Eleventh information indicates the first moment. The first moment is associated with the fourth moment and the second duration.

In a possible design, before sending the at least one piece of the second information, the fifth information, and the ninth information to the UPF, the SMF may receive tenth information from the first user equipment. The tenth information indicates the first duration and/or the third moment.

In a possible design, the SMF may determine that the first packet is sent by first user equipment to second user equipment, and send eleventh information to the first user equipment. The eleventh information includes information about the PDU session of the first packet.

In a possible design, the information about the PDU session includes at least one of a PDU session identifier, a QFI, a MAC address, or a VLAN ID.

In a possible design, before sending the ninth information, the SMF may determine the first moment based on the third moment, the first duration, and the second duration, or based on the third moment and the third duration, or based on the fourth moment and the second duration.

According to a fourth aspect, an embodiment of this application provides a communication method. The method may be performed by a UPF, first user equipment, and an SMF. Specifically, the UPF may be configured to perform the method shown in any one of the first aspect or the possible designs of the first aspect. The first user equipment may be configured to perform the method shown in any one of the second aspect or the possible designs of the second aspect. The SMF may be configured to perform the method shown in any one of the third aspect or the possible designs of the third aspect.

According to a fifth aspect, an embodiment of this application provides a communication apparatus. The communication apparatus is configured to implement a function of a UPF in the first aspect or each possible design example of the first aspect. The function may be implemented by hardware, or may be implemented by hardware executing corresponding software. The hardware or the software includes one or more modules corresponding to the foregoing function.

In a possible design, a structure of the communication apparatus may include a communication module and a processing module. These modules may perform corresponding functions of the UPF in the first aspect or each possible design example of the first aspect. For details, refer to detailed descriptions in the first aspect. Details are not described herein again.

In a possible design, a structure of the communication apparatus includes a processor, and optionally further includes a communication interface and a memory. The communication interface may be configured to receive and send information or data, and may be used by the communication apparatus to communicate and interact with another communication apparatus in a network system. The processor is configured to support the communication apparatus in performing a corresponding function of the UPF in the first aspect or each possible design example of the first aspect. The memory is coupled to the processor, and is configured to store program instructions and data that are necessary for the communication apparatus.

For example, the communication apparatus is the UPF or a component in the UPF, for example, a chip or a transceiver.

According to a sixth aspect, an embodiment of this application provides a communication apparatus. The communication apparatus is configured to implement a function of first user equipment in the second aspect or each possible design example of the second aspect. The function may be implemented by hardware, or may be implemented by hardware executing corresponding software. The hardware or the software includes one or more modules corresponding to the foregoing function.

In a possible design, a structure of the communication apparatus may include a communication module and a processing module. These modules may perform corresponding functions of the first user equipment in the second aspect or each possible design example of the second aspect. For details, refer to detailed descriptions in the method example. Details are not described herein again.

In a possible design, a structure of the communication apparatus includes a processor, and optionally further includes a communication interface (for example, a wireless transceiver) and a memory. The communication interface may be configured to receive and send information or data, and may be used by the communication apparatus to communicate and interact with another communication apparatus in a network system. The processor is configured to support the communication apparatus in performing a corresponding function of the first user equipment in the second aspect or each possible design example of the second aspect. The memory is coupled to the processor, and is configured to store program instructions and data that are necessary for the first communication apparatus.

For example, the communication apparatus is UE or a component in the UE, for example, a chip or a transceiver.

According to a seventh aspect, an embodiment of this application provides a communication apparatus. The communication apparatus is configured to implement a function of an SMF in the third aspect or each possible design example of the third aspect. The function may be implemented by hardware, or may be implemented by hardware executing corresponding software. The hardware or the software includes one or more modules corresponding to the foregoing function.

In a possible design, a structure of the communication apparatus may include a communication module and a processing module. These modules may perform corresponding functions of the SMF in the third aspect or each possible design example of the third aspect. For details, refer to detailed descriptions in the method example. Details are not described herein again.

In a possible design, a structure of the communication apparatus includes a processor, and optionally further includes a communication interface and a memory. The communication interface may be configured to receive and send information or data, and may be used by the communication apparatus to communicate and interact with another communication apparatus in a network system. The processor is configured to support the communication apparatus in performing a corresponding function of the SMF in the third aspect or each possible design example of the third aspect. The memory is coupled to the processor, and is configured to store program instructions and data that are necessary for the first communication apparatus.

For example, the communication apparatus is a base station or a component in the base station, for example, a chip or a transceiver.

According to an eighth aspect, an embodiment of this application provides a communication system. The communication system may include the communication apparatus provided in the fifth aspect, the communication apparatus provided in the sixth aspect, and the communication apparatus provided in the seventh aspect.

According to a ninth aspect, this application provides a computer storage medium. The computer storage medium stores instructions. When the instructions are invoked and executed on a computer, the computer is enabled to perform the method in any one of the first aspect or the possible designs of the first aspect, the method in any one of the second aspect or the possible designs of the second aspect, or the method in any one of the third aspect or the possible designs of the third aspect.

According to a tenth aspect, this application provides a computer program product. The computer program product may include a program or instructions. When the computer program product runs on a computer, the computer is enabled to perform the method in any one of the first aspect or the possible designs of the first aspect, the method in any one of the second aspect or the possible designs of the second aspect, or the method in any one of the third aspect or the possible designs of the third aspect.

According to an eleventh aspect, this application provides a chip or a chip system including the chip. The chip may include a processor. The chip may further include a memory (or a storage module) and/or a transceiver (or a communication module). The chip may be configured to perform the method in any one of the first aspect or the possible designs of the first aspect, the method in any one of the second aspect or the possible designs of the second aspect, or the method in any one of the third aspect or the possible designs of the third aspect. The chip system may include the chip, or may include the chip and another discrete component, for example, a memory (or a storage module) and/or a transceiver (or a communication module).

For beneficial effects of the second aspect to the eleventh aspect and the possible designs of the second aspect to the eleventh aspect, refer to the descriptions of the beneficial effects of the method in any one of the first aspect or the possible designs of the first aspect.

DESCRIPTION OF EMBODIMENTS

To improve flexibility of indicating a frequency domain resource for multicast transmission, this application provides a communication method. The following further describes in detail this application with reference to accompanying drawings. It should be understood that a specific operation method in a method embodiment described below may also be applied to an apparatus embodiment or a system embodiment.

Figure 1:
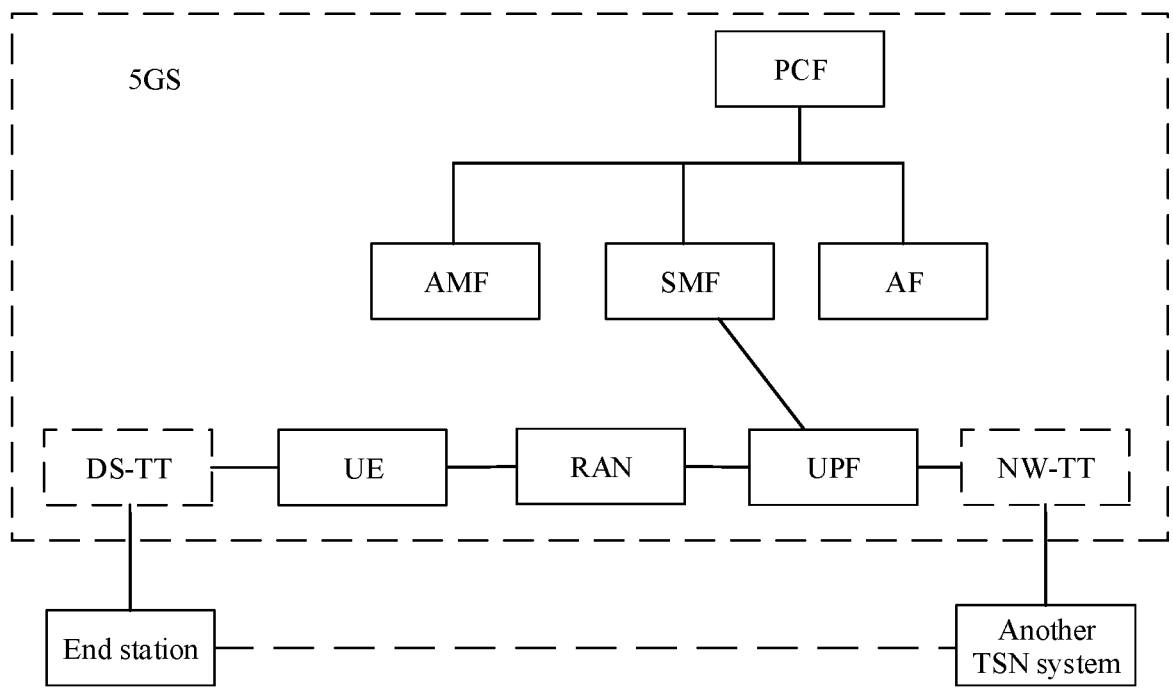
FIG. 1 is a schematic diagram of an architecture of a communication system, according to an embodiment of this application.

The communication method provided in embodiments of this application may be applied to a wireless communication system 100 shown in FIG. 1.

As shown in FIG. 1, a 5GS can function as a TSN bridge to communicate with another TSN system. A DS-TT and an NW-TT may be respectively used as translators between the 5GS and another TSN system, to implement a connection between the 5GS and the another TSN system.

The 5GS shown in FIG. 1 may include a policy control function (PCF), an application function (AF), an access and mobility management function (AMF), a session management function (SMF), and a (radio) access network ((R)AN) device, a UPF, and the like.

For ease of description, the following uses an example in which the (R)AN device is referred to as a RAN for description. The RAN may be a base station, and may be specifically an evolved NodeB (evolutional NodeB, eNB or eNodeB), a small cell (micro/picoeNB), or a transmission/reception point (TRP) in an LTE system, or may be a radio controller in a cloud radio access network (CRAN) scenario. Alternatively, the RAN may be a relay station, an access point, a wearable device, and a base station in a future 5G network or a base station in a future evolved PLMN network, for example, a new-generation node B (gNB). This is not limited in this embodiment of this application. Alternatively, a third communication apparatus may be a chip that has a communication module or may be connected to the communication module, for example, a chip in a base station.

The AMF described above is a control plane network element provided by an operator network, and is responsible for access control and mobility management when a terminal accesses the operator network. For example, the AMF has functions such as mobility status management, allocation of a temporary user identity, and user authentication and authorization. It should be understood that in future communication such as a 6th generation (6G), the AMF may still be the AMF or may have another name. This is not limited in this application.

The PCF is a control plane function provided by an operator, and is configured to provide a protocol data unit (PDU) session policy for the SMF. The policy herein may include a charging-related policy, a quality of service (QoS)-related policy, a data flow identification and steering (also referred to as forwarding) policy, an authorization-related policy, and the like. It should be understood that in future communication such as 6G, the PCF may be the PCF or may have another name. This is not limited in this application.

The SMF described above is the control plane network element provided by the operator network, and is responsible for managing a PDU session of the terminal. In other words, the SMF serves the PDU session of the terminal. The PDU session is a channel used to transmit a PDU, and the terminal and a DN needs to transmit the PDU to each other through the PDU session. The SMF is responsible for establishment, maintenance, deletion, and the like of the PDU session. The SMF includes functions related to a session, for example, session management (for example, session establishment, modification, and release, including tunnel maintenance between the UPF and the RAN), selection and control of the UPF, service and session continuity (SSC) mode selection, and roaming. The SMF may be configured to select a UPF serving a user, for example, select a UPF that is closer to a base station for the user, to reduce a packet sending and receiving delay of the user. In addition, the SMF may identify, based on PDU session information (for example, service type information and MAC address information), whether the PDU session is used for data transmission between UEs in the 5GS. It should be understood that in future communication such as 6G, the SMF may still be the SMF or may have another name. This is not limited in this application.

The UPF may serve as a protocol data unit anchor (PDU session anchor) to access an application server, so as to support service data transmission between the UE and the application server. For a TSC service, the UPF may be configured to perform TSC packet transmission within the 5GS or between the 5GS and another TSN system. A TSC packet may also be referred to as a TSC service packet, and is used to carry TSC service data. The TSC service is a service that has a high transmission delay requirement, for example, industrial control and remote surgery.

The AF may be used to: select, reselect, locate, and relocate an AS of an application, and interact with a core network. In actual application, the AF may alternatively be an apparatus independent of the AS, or the AF may be co-located with the AS. This is not specifically limited in the present application.

As shown in FIG. 1, the 5GS may perform TSC packet transmission with an end station by using the DS-TT. The end station may be a device in a scenario such as industrial control or remote surgery, or may be a TSN bridge. For example, the end station may be a factory device such as a mechanical arm.

Optionally, the DS-TT may be co-located with the UE. For example, the DS-TT is used as a module (for example, including a logical module and/or a hardware component) inside the UE. Alternatively, the DS-TT and the UE may be independently disposed. When the UE needs to send a TSC packet to another TSN system, the TSC packet needs to be processed by the DS-TT before being sent to the another TSN system.

Similarly, the NW-TT and the UPF may be co-located. For example, the NW-TT is used as a module inside the UPF. Alternatively, the NW-TT and the UPF may be independently disposed. When the UPF needs to send a TSN packet to another TSN system, the TSC packet needs to be processed by the NW-TT before being sent to the another TSN system.

When the packet is transmitted across the TSN system, the DS-TT and the NW-TT need to perform operations such as converting an encapsulation format of the packet to meet encapsulation format requirements of different TSN systems for the TSN packet. In addition, there is a hold & forward buffering mechanism in the DS-TT and the NW-TT. To be specific, the TSC packet that arrives in advance is not sent until predetermined time. In this application, that the packet is transmitted across the TSN system means that the packet is sent from one TSN system to the 5GS, or that the packet is sent from the 5GS to another TSN system.

Figure 2:
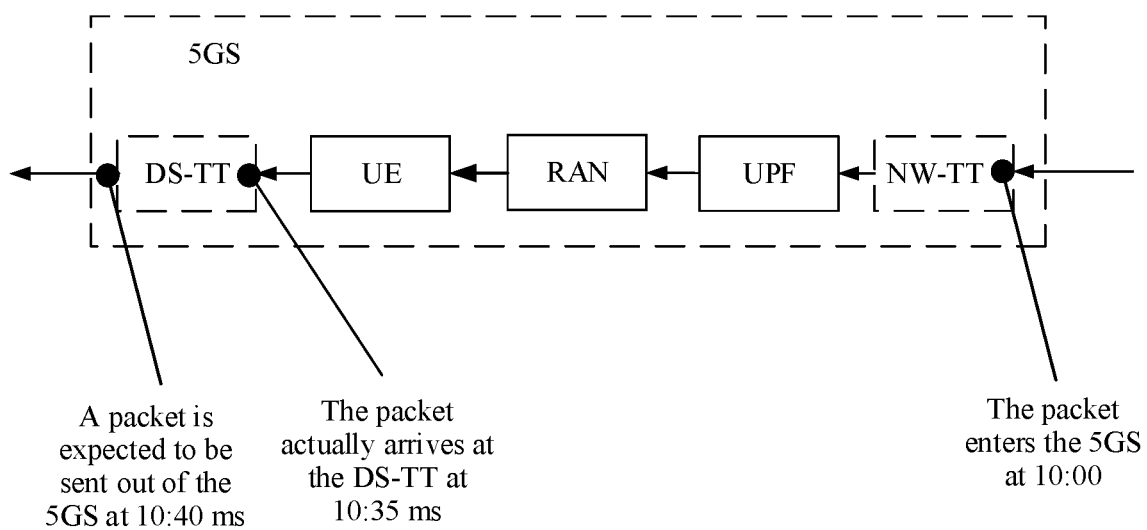
FIG. 2 is a schematic diagram of a logic process of packet transmission, according to an embodiment of this application.

For example, as shown in FIG. 2, a TSC service packet is sent from the UPF to the UE, and the packet enters the 5GS through an ingress port of the NW-TT at 10:00. The ingress port of the NW-TT is a port used by the NW-TT to receive a TSC packet from a TSN system other than the 5GS. This TSC packet should (or is expected to) be sent out of the 5GS through a port on the DS-TT at 10:40 milliseconds (ms) based on a plan. However, in an actual transmission process, because a network condition is good at this time, if the TSC packet arrives at the DS-TT at 10:35 ms, the TSC packet needs to wait for 5 ms in the DS-TT according to the hold & forward buffering mechanism, and the packet cannot be sent from the DS-TT until the expected 10:40 ms.

The advantage of the hold & forward buffering mechanism is that it supports deterministic forwarding of the TSC packet. Deterministic forwarding means that a packet sending node (for example, the UPF in this application) periodically opens a send window at a specific time point, so that a large quantity of packets (which may be referred to as bursts) are suddenly sent at the time point. The send window is closed in other time. Within the time when the send window is closed, even if a packet that needs to be sent arrives at the packet sending node, the packet is not sent, but waits for the time when the send window is opened. In a burst sending mechanism of the TSC packet, a network side may send time sensitive communication assistance information (TSCAI) to an access network device (for example, a base station). The TSCAI carries a burst arrival time parameter. For uplink transmission, the parameter indicates a moment at which a burst is sent from the UE. For downlink transmission, this parameter indicates a moment at which the burst arrives at the access network device. In addition, the TSCAI may further carry a burst sending period (that is, a first period). The following separately describes working principles of the TSCAI in a downlink transmission process and an uplink transmission process.

Figure 3:
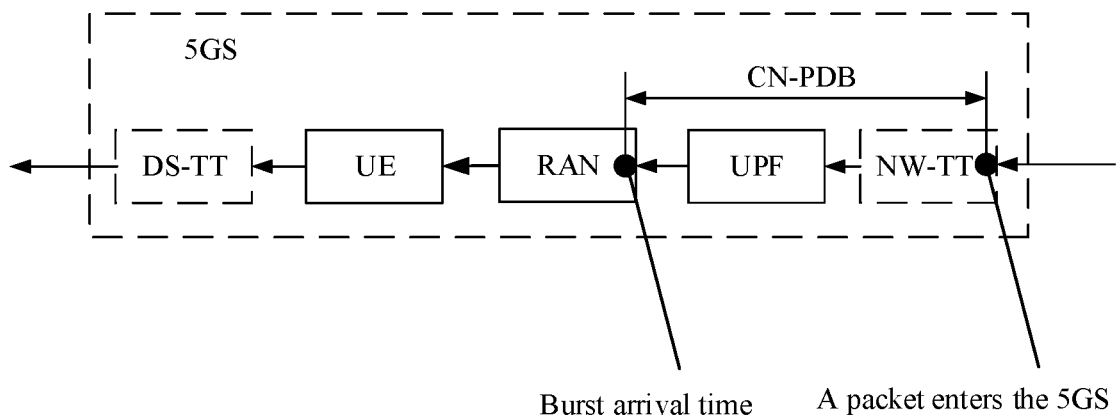
FIG. 3 is a schematic diagram of another logic process of packet transmission, according to an embodiment of this application.

As shown in FIG. 3, for the downlink transmission, burst arrival time refers to a moment at which the burst arrives at an ingress port of the access network device. The moment is equal to a moment at which the burst arrives at the ingress port of the NW-TT plus a core network-packet delay budget (CN-PDB). The CN-PDB is equal to maximum residence time of the packet on the UPF and the NW-TT plus a maximum transmission delay in which the packet is transmitted from an egress of the UPF to an ingress port of the RAN. It should be understood that the maximum residence time of the packet on the UPF and the NW-TT includes delays of operation processing and forwarding performed by the UPF and the NW-TT on the packet.

Figure 4:
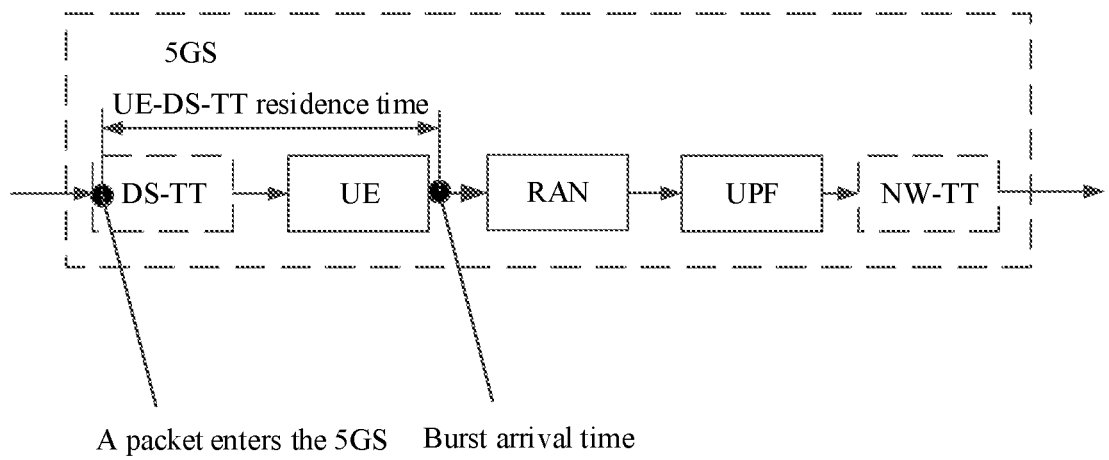
FIG. 4 is a schematic diagram of another logic process of packet transmission, according to an embodiment of this application.

As shown in FIG. 4, during the uplink transmission (from first UE to the UPF), the burst arrival time is a moment at which the burst arrives at an egress port of the UE, and then the burst is sent to the access network device. The moment is equal to a moment when the burst arrives at an ingress port of the DS-TT plus UE-DS-TT residence time. The egress port is a port used by the first UE to send a first packet in uplink. The UE-DS-TT residence time is equal to maximum residence time of the packet on the UE and the DS-TT. It should be understood that the maximum residence time of the packet on the UE and the DS-TT includes delays of operation processing and forwarding performed by the UE and the DS-TT on the packet.

Based on the foregoing description, the access network device may obtain, based on the TSCAI, time at which an uplink burst and a downlink burst arrive at the access network device, to ensure that when the burst arrives, the access network device has sufficient resources for sending the burst.

However, for a TSC packet forwarding process between UEs, the TSC packet enters the 5GS from one UE, and needs to be sent to another UE in the 5GS. After the TSC packet arrives at the UPF through uplink transmission, the UPF performs a local switch operation and then switches to downlink transmission to arrive at the another UE. Because the TSC packet does not pass through the NW-TT, the NW-TT cannot perform the hold & forward buffering mechanism on the TSC packet. After receiving each TSC packet, the UPF immediately performs downlink forwarding of the TSC packet. For example, the TSC packet may arrive at the access network device at any time. Therefore, the access network device cannot obtain packet arrival time and a packet arrival period according to a mechanism similar to the TSCAI, and the access network device may not have sufficient resources for forwarding the burst.

To resolve the foregoing technical problem, an embodiment of this application provides a communication method. The method may be performed by the UPF shown in FIG. 1.

Figure 5:
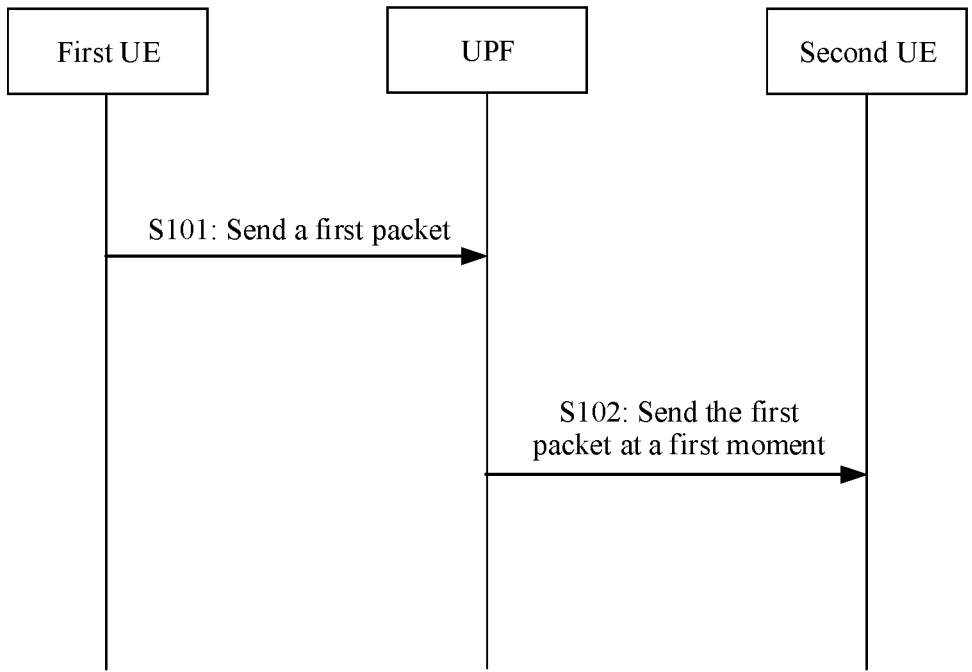
FIG. 5 is a schematic flowchart of a communication method, according to an embodiment of this application.

As shown in FIG. 5, the method may include the following steps.

S101: The UPF receives a first packet of a first data stream from first UE.

A transmit end of a packet of the first data stream is the first UE, and a receive end of the packet of the first data stream is second UE.

Optionally, the first packet is a TSC packet.

S102: The UPF sends the first packet to the second UE at a first moment.

For example, the first moment is associated with a third moment, first duration, and second duration. The third moment is a moment at which the first packet arrives at an ingress port of the first UE (or referred to as a moment at which the first packet arrives at the first UE). The first duration is residence time (or referred to as UE-DS-TT residence time) of the first packet on the first UE and a DS-TT. The second duration is a packet delay budget (or referred to as a packet delay budget PDB corresponding to the first user equipment) corresponding to an uplink PDU session of the first packet. The ingress port of the first UE is a port used by the first UE to receive the first packet.

Alternatively, the first moment is associated with a fourth moment and second duration. The fourth moment is a moment at which the first packet arrives at an egress port of the first user equipment, that is, burst arrival time of uplink transmission. At the fourth moment, the egress port of the UE starts uplink transmission of the first packet.

Based on the method shown in FIG. 5, after receiving the first packet from the first UE, the UPF may forward the first packet to the second UE based on the first moment, so that the first packet that arrives at the UPF in advance is not forwarded to the second UE until the first moment, to support deterministic sending and ensure that the TSC packet is sent at a determined moment, so as to provide deterministic delay assurance for applications such as industrial control and telemedicine.

For example, in an implementation of S102, after receiving the first packet, the UPF may send the first packet to the second UE after fourth duration. The fourth duration is associated with a second moment, the third moment, the first duration, and the second duration. The second moment is a moment at which the UPF receives the first packet. Specifically, the fourth duration=the first duration+the second duration−(the second moment−the third moment). It should be understood that the fourth duration is duration in which the first packet needs to wait in the UPF to support deterministic sending. Alternatively, the UPF may send the first packet to the second UE when local time is the first moment.

In a possible example of S102, the first moment is associated with the third moment, the first duration, and the second duration.

The following describes the second moment, the third moment, the first duration, and the second duration with reference to the accompanying drawings.

Figure 6:
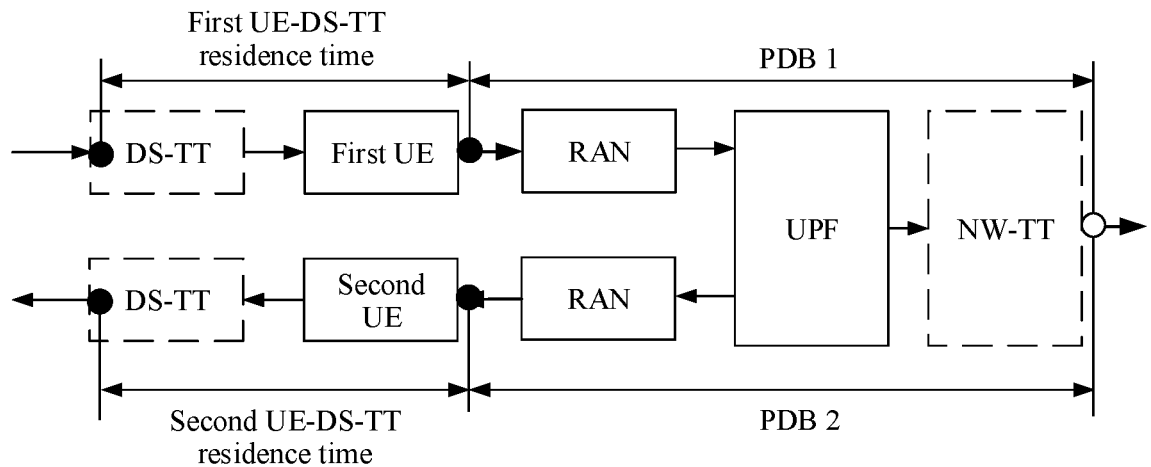
FIG. 6 is a schematic diagram of another logic process of packet transmission, according to an embodiment of this application.

As shown in FIG. 6, in a process in which the first packet is forwarded from the first UE to the second UE by using the UPF, a theoretical delay of the first packet in an uplink transmission process is theoretical duration required in a processing process from a moment at which the first packet enters the DS-TT (or when the DS-TT is used as a component of the first UE) to a moment at which the first packet arrives at the UPF and is forwarded by the UPF.

For example, in this application, it may be considered that the theoretical duration is associated with theoretical duration in which the first packet resides on the DS-TT and the first UE (that is, the first duration) (that is, UE-DS-TT residence time shown in FIG. 6, which may be referred to as the first duration in this application), and a packet delay budget (PDB) (that is, PDB 1 shown in FIG. 6, which may be referred to as the second duration in this application) corresponding to the uplink PDU session to which the first packet belongs. The PDB 1 indicates, when an uplink packet is sent to a TSN system other than a 5GS, a sum of duration for processing and forwarding the uplink packet by a RAN, the UPF, and an NW-TT from a moment at which the uplink packet is sent from the first UE to a moment at which the uplink packet is sent out of the 5GS. In other words, the PDB 1 indicates residence time of the uplink packet in the 5GS after the uplink packet is sent from the first UE and before the NW-TT sends the uplink packet out of the 5GS. Specifically, the theoretical duration is equal to a sum of first UE-DS-TT residence time shown in FIG. 6 and the PDB 1 (the theoretical duration may be referred to as third duration in this application). In addition, the PDB 2 shown in FIG. 6 represents a PDB corresponding to a downlink QoS flow of the first packet. Second UE-DS-TT residence time indicates residence time of the first packet on the DS-TT and the second UE.

A meaning of the theoretical duration is that the UPF determines the first moment based on the theoretical duration, so that after the first packet enters the DS-TT (or the first UE), downlink transmission of the first packet is started at the first moment after the theoretical duration.

In addition, in a process of determining the first moment, in addition to the theoretical duration, the UPF further needs to learn of a moment (that is, the third moment) at which the first packet actually enters the DS-TT (or the first UE) and a moment (that is, the second moment) at which the UPF actually receives the first packet. The UE may read a local timestamp when receiving the first packet, to obtain the third moment. The UPF may read the local timestamp when receiving the first packet, to obtain the second moment.

Therefore, the UPF may obtain the first duration and the second duration, and determine a sum of the first duration and the second duration. In other words, the UPF may obtain the third duration. In addition, the UPF may obtain duration between the third moment and the second moment (that is, duration obtained by subtracting the third moment from the second moment).

Then, the UPF may determine the first moment based on the first duration, the second duration, and the third moment. Further, the UPF may send the first packet to the second UE when the local timestamp is the first moment.

Alternatively, the UPF may determine, based on the sum of the first duration and the second duration and the duration between the third moment and the second moment, duration (namely, the fourth duration) in which the first packet needs to reside on the UPF. Further, after receiving the first packet, the UPF may send the first packet to the second UE after the fourth duration.

Alternatively, after determining the first moment based on the first duration, the second duration, and the third moment, the UPF may determine the fourth duration based on the first moment and the second moment. Further, after receiving the first packet, the UPF may send the first packet to the second UE after the fourth duration.

Figure 7:
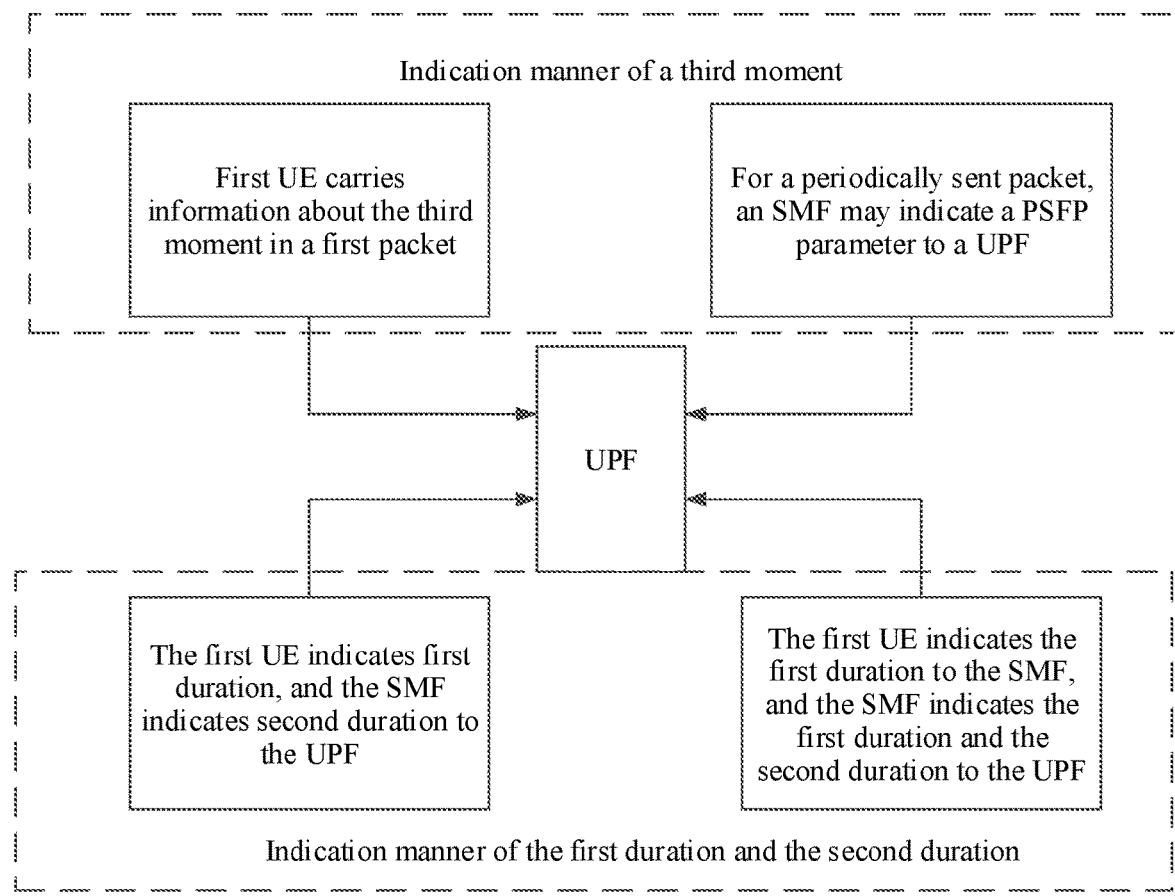
FIG. 7 is a schematic diagram of an indication manner of a third moment, first duration, and second duration, according to an embodiment of this application.

Specifically, as shown in FIG. 7, the first UE may send tenth information to an SMF. The tenth information may include information about the first duration, to indicate the first duration. The SMF may send second information to the UPF. The second information may indicate the first duration. The first UE may send the information about the first duration to the SMF based on a request of the SMF or based on a default configuration. Alternatively, the information about the first duration may be sent by the first UE to the UPF. Specifically, the first UE may carry the information about the first duration in the first packet, and the UPF obtains the information about the first duration from the first packet after receiving the first packet. In addition, if the tenth information sent by the UE to the SMF may further include information indicating the third moment, the SMF may send the second information to the UPF. The second information may indicate the first duration and/or the third moment.

In addition, the SMF may send fourth information to the UPF. The fourth information indicates the second duration. When the SMF indicates the first duration and the second duration to the UPF, the SMF may indicate the first duration and the second duration by using a same message. For example, the second information and the fourth information may be respectively carried in different fields of the same message. Alternatively, the second information and the fourth information may be respectively carried in different messages.

In addition, the SMF may notify the UPF of a calculation result of the first duration and the second duration. For example, the SMF indicates the third duration to the UPF. The third duration is associated with the first duration and the second duration.

For example, the SMF may send fifth information to the UPF. The fifth information indicates the third duration. In addition, the fifth information may indicate the UPF to determine the first moment based on the third moment and the third duration. Alternatively, the fifth information may specifically indicate that the third duration is the sum of the first duration and the second duration, so that the UPF may determine the first moment based on the third duration. For example, the fifth information may include indication information, to indicate that the third duration is the sum of the first duration and the second duration, or the fifth information may carry the third duration by using a specific field. The field indicates the sum of the first duration and the second duration.

The information about the third moment may be sent by the first UE to the UPF. The first UE may send the information about the third moment to the UPF based on a configuration of the SMF. Specifically, as shown in FIG. 7, the first UE may carry the information about the third moment in the first packet. For example, the information about the third moment may be carried in first information in the first packet. After receiving the first packet, the UPF obtains the information about the third moment from the first packet. The information about the third moment may be a timestamp (Tsi) when the first UE receives the first packet.

Alternatively, the information about the third moment may be sent by the UE to the SMF. For example, the first UE sends the tenth information to the SMF. The tenth information includes the information about the third moment and indicates the third moment. Then, the SMF sends third information to the UPF. The third information indicates the third moment. In addition, the SMF may notify the UPF of a calculation result of the first duration and the third moment. For example, the first UE sends eighth information to the UPF. The eighth information may indicate a fifth moment. The fifth moment is associated with the first duration and the third moment. Specifically, the fifth moment is a moment at which a time interval from the third moment is the first duration and that is after the third moment. For example, the fifth moment is a moment at which the first packet arrives at the egress port of the first UE.

In addition, the SMF may notify the UPF of a calculation result of the first moment. For example, the SMF sends ninth information to the UPF. The ninth information may indicate the first moment. The first moment may be determined based on the third moment and the third duration. In other words, the first moment is associated with the third moment and the third duration. Specifically, the first moment is a moment at which a time interval from the third moment is the third duration and that is after the third moment.

Alternatively, the first moment may be determined based on the third moment, the first duration, and the second duration. In other words, the first moment is associated with the third moment, the first duration, and the second duration. Specifically, the first moment is a moment at which a time interval from the third moment is the sum of the first duration and the second duration and that is after the third moment.

When the first UE indicates the third moment and the first duration to the UPF, the UE may indicate the third moment and the first duration by using a same message or by using different fields in the first packet. Alternatively, the information about the first duration and the information about the third moment may be respectively carried in different messages. In addition, the first UE may notify the UPF of the calculation result of the third moment and the first duration. For example, the first UE indicates the fifth moment to the UPF. The fifth moment is associated with the third moment and the first duration. Specifically, the fifth moment is a moment at which a time interval from the third moment is the first duration and that is after the third moment. It should be understood that the fifth moment may be the moment at which the first packet arrives at the egress port of the first UE.

For example, information about the fifth moment may be carried in the first packet. For example, the fifth moment is indicated by using the first information. In addition, the SMF may determine the fifth moment based on the third moment and the first duration, and indicate the fifth moment to the UPF by using the eighth information.

It should be understood that information about the second moment may be obtained by the UPF. The information about the second moment may indicate the second moment. Specifically, the UPF may obtain a timestamp (Tsm) when the first packet is received. The timestamp is the information about the second moment, and a moment indicated by the timestamp is the second moment.

In addition, it can be learned from FIG. 7 that, for the periodically sent first packet, the SMF may further send a per-stream filtering and policing (PSFP) parameter of the first packet to the UPF, and the UPF determines the third moment based on the PSFP parameter. It should be understood that the PSFP parameter corresponds to one QoS flow of UE-UE TSC, and PSFP parameters of QoS flows of TSC services between different UEs or different QoS flows between two same UEs may be different.

Specifically, the SMF may send parameters such as a PSFP admin base time (PSFPAdminBaseTime) parameter, a PSFP admin cycle time (PSFPAdminCycleTime) parameter, and/or a time interval value (time Interval Values) to the UPF. The PF may maintain a counter for each QoS flow corresponding to uplink transmission in the UE-UE TSC, a counter of a corresponding QoS flow is set to 0 based on a moment indicated by PSFPAdminBaseTime (the moment is a moment at which a 1st periodically sent packet arrives at an ingress port of the first UE, and the moment may be indicated by PSFPAdminCycleTime below, for example, 10:30), a value of the counter is increased by 1 each time duration (the duration is a packet sending period, and may be indicated by the PSFPAdminCycleTime, for example, 1 minute.) specified by the PSFPAdminCycleTime expires. In this case, actual duration of the packet in the uplink transmission is Tsm−(PSFPAdminBaseTime+PSFPAdminCycleTime*counter). Tsm indicates the second moment, and (PSFPAdminBaseTime+PSFPAdminCycleTime*counter) may be considered as the third moment.

Then, the UPF may determine the first moment based on the first duration, the second duration, and (PSFPAdminBaseTime+PSFPAdminCycleTime*counter), and send the first packet when the local time is the first moment.

Alternatively, the UPF may determine the fourth duration based on a difference between the actual duration and the sum of the first duration and the second duration (or based on the third duration).

Alternatively, the UPF may determine the fourth duration based on the first moment and the second moment.

In another possible implementation of S102, the first moment is associated with the fourth moment and the second duration. The fourth moment is the moment at which the first packet arrives at the egress port of the first UE. The second duration is the PDB 1 shown in FIG. 6. Therefore, a moment after the second duration from the fourth moment is a theoretical moment at which the uplink transmission of the first packet is ended and the downlink transmission is started, that is, the first moment. Therefore, the UPF may send the first packet to the second UE at the first moment.

The SMF may send sixth information and the fourth information to the UPF. The sixth information may indicate the fourth moment. The fourth information may indicate the second duration. In addition, the SMF may further send seventh information to the UPF. The seventh information may indicate a burst sending period, namely, a first period. The first period is, for example, a period in which the first packet is sent from the first UE, or a time period between start moments of two packets. The start moment may be a moment at which the packet arrives at the egress port of the first UE. Specifically, the first period may indicate a time period between moments at which two consecutively sent packets separately arrive at the egress port of the first UE.

For example, the SMF may send TSCAI to the UPF. The TSCAI indicates the fourth moment and the first period.

In addition, the SMF may determine the first moment based on the fourth moment and the second duration, and the SMF sends ninth information to the UPF. The ninth information indicates the first moment.

With reference to the accompanying drawings, the following describes an implementation procedure of a communication method provided in embodiments of this application.

Figure 8:
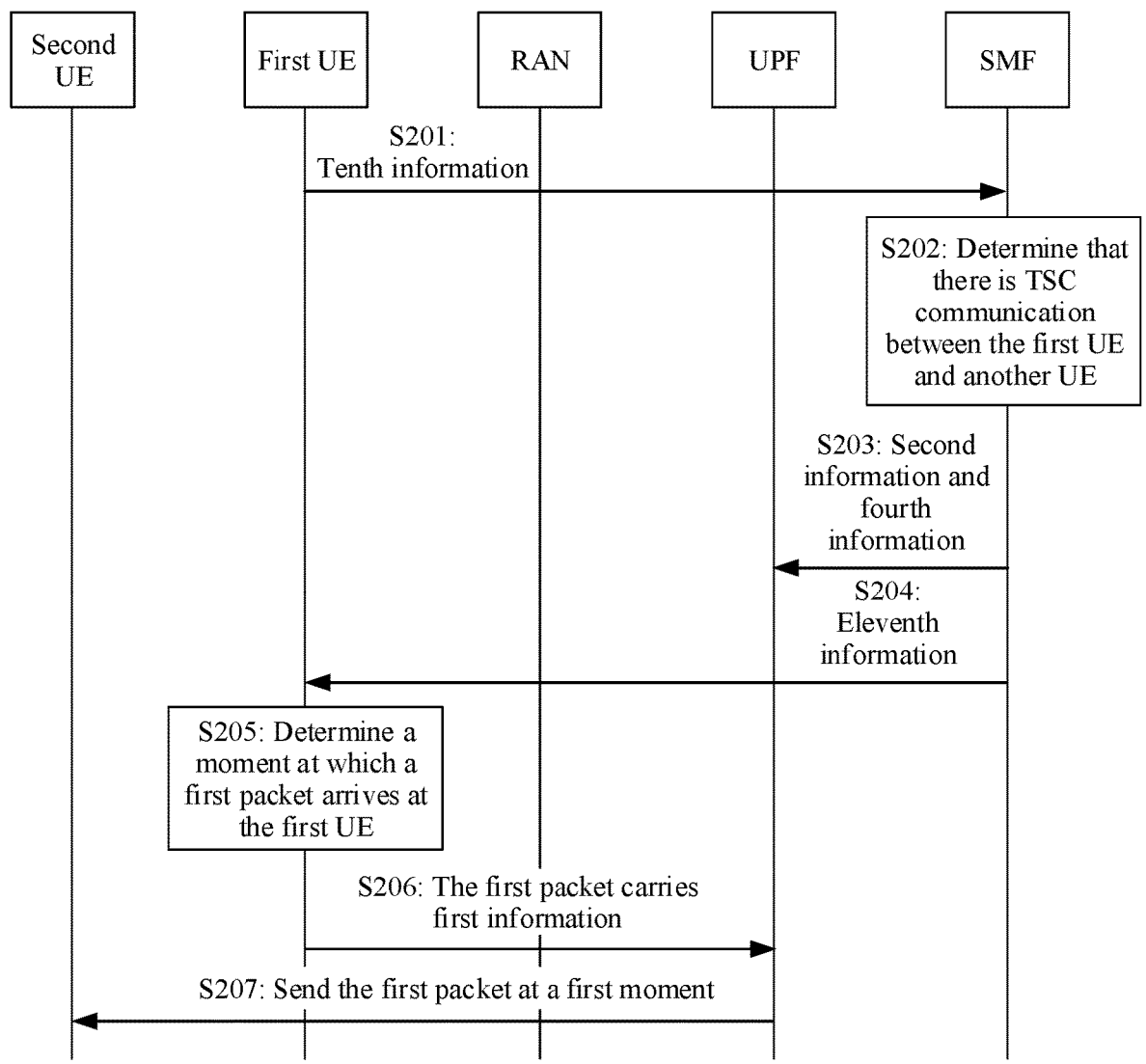
FIG. 8 is a schematic flowchart of another communication method, according to an embodiment of this application.

For example, as shown in FIG. 8, a communication method provided in this embodiment of this application may include the following steps.

S201: First UE sends tenth information to an SMF in a process of establishing a PDU session.

The tenth information indicates a first duration.

S202: The SMF determines that there is TSC communication between the first UE and another UE (for example, second UE), for example, determines that the PDU session is used for data transmission between the first UE and the another UE, or determines that the PDU session is used for data transmission between different ports on one DS-TT of the first UE, or determines that the PDU session is used for data transmission between different ports on different DS-TTs of the first UE.

The SMF may determine that the first UE sends a TSC packet to the second UE by using the PDU session.

S203: The SMF sends second information and fourth information to the UPF.

The second information indicates the first duration. The fourth information indicates a second duration.

S204: The SMF sends eleventh information to the first UE.

The eleventh information may include information about the PDU session, to indicate the PDU session. For example, the eleventh information may carry information such as a PDU session identifier, a QoS flow identifier (QFI), a media access control (MAC) address, or a virtual local area network identifier (VLAN ID). The MAC address may include a source MAC address and/or a destination MAC address.

The eleventh information may be carried in a PDU session modification message sent by the SMF to the first UE.

S205: The first UE determines, based on the eleventh information, a moment (that is, a third moment) at which a first packet arrives at an ingress port of the first UE.

The first packet corresponds to the information about the PDU session indicated by the eleventh information. For example, a PDU session identifier corresponding to the first packet is consistent with the PDU session identifier indicated by the eleventh information, or a QFI corresponding to the first packet is a QFI indicated by the eleventh information, a source MAC address of the first packet is a source MAC address indicated by the eleventh information, or a destination MAC address of the first packet is a destination MAC address indicated by the eleventh information, or a virtual local area network identifier VLAN ID of the first packet is consistent with a virtual local area network identifier indicated by the eleventh information.

After the first packet arrives at the first UE, the first UE may read current system time to obtain the moment at which the first packet arrives at the ingress port of the first UE, and use the moment as the third moment.

S206: The first UE sends the first packet to the UPF. The first packet carries first information.

The first information indicates the third moment.

Correspondingly, the UPF receives the first packet.

S207: The UPF sends the first packet to the second UE at a first moment.

The first moment is determined based on the third moment, the first duration, and the second duration. The third moment is obtained by the UPF based on the first information. The first duration is obtained by the UPF based on the second information. The second duration is obtained by the UPF based on the fourth information.

Specifically, the first moment may be determined according to the following formula:

$$\text{First moment} = \text{first duration} + \text{second duration} + \text{third moment}.$$

The UPF may send the first packet when local time is the first moment. Alternatively, after receiving the first packet at a second moment, the UPF may send the first packet to the second UE after (first duration+second duration−(second moment−third moment)). The UPF determines the second moment when receiving the first packet.

Figure 9:
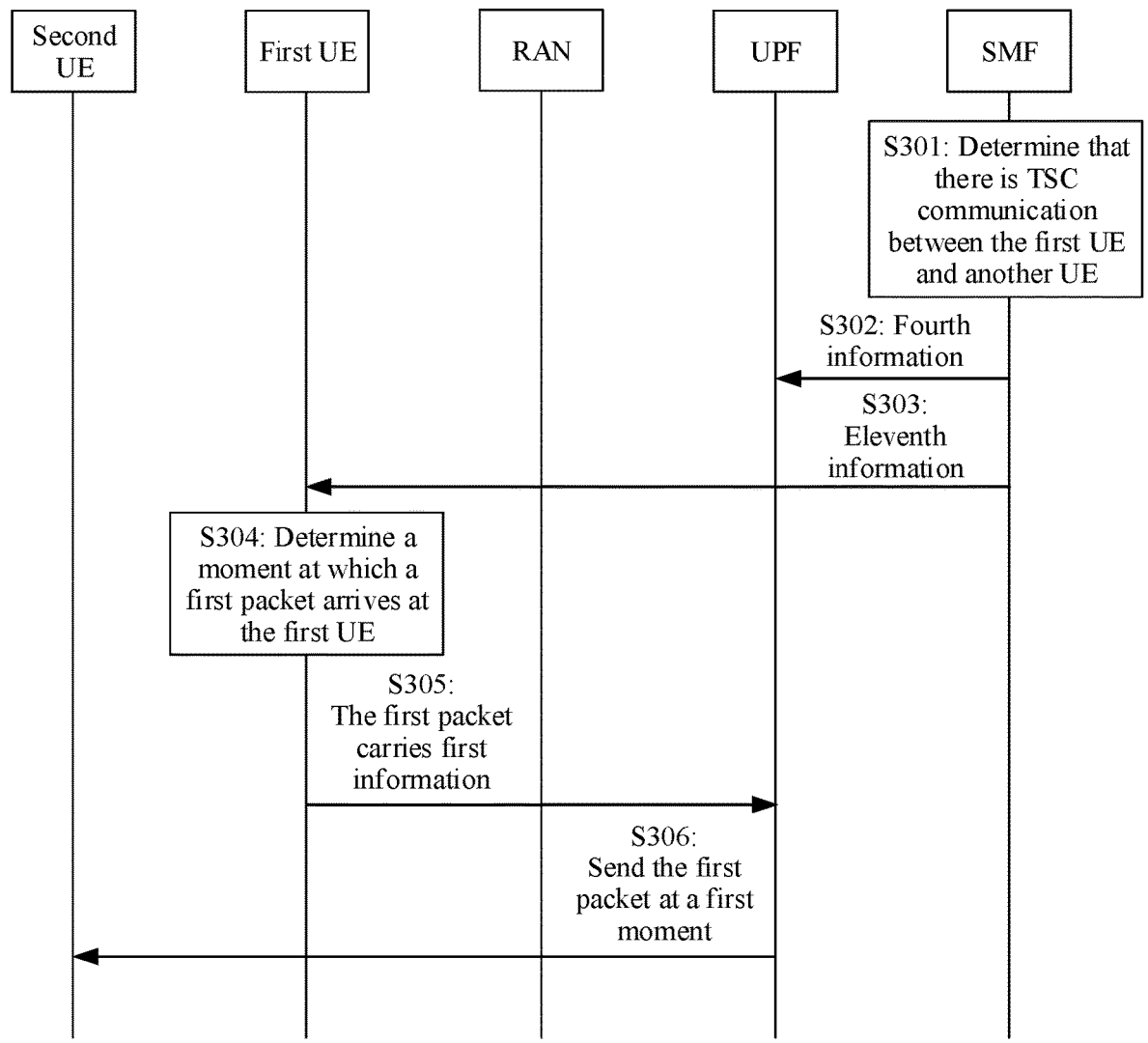
FIG. 9 is a schematic flowchart of another communication method, according to an embodiment of this application.

For example, as shown in FIG. 9, a communication method provided in this embodiment of this application may include the following steps.

S301: An SMF determines that there is TSC communication between first UE and another UE (for example, second UE).

The SMF may determine that the first UE sends a TSC packet to the second UE by using a PDU session.

S302: The SMF sends fourth information to a UPF.

The fourth information indicates a second duration.

S303: The SMF sends eleventh information to the first UE.

The eleventh information includes information about the PDU session, for example, a PDU session identifier, a QFI of the PDU session, a MAC address, or a VLAN ID.

The eleventh information may be carried in a PDU session modification message sent by the SMF to the first UE.

S304: The first UE determines, based on the eleventh information, a moment (that is, a third moment) at which a first packet arrives at an ingress port of the first UE.

After the first packet arrives at the first UE, the first UE may obtain the moment at which the first packet arrives at the ingress port of the first UE, and use the moment as the third moment.

S305: The first UE sends the first packet to the UPF. The first packet carries first information.

The first information indicates the third moment and the first duration. The first information is carried by the first UE in the first packet based on the eleventh information.

Correspondingly, the UPF receives the first packet.

S306: The UPF sends the first packet to the second UE at a first moment.

The first moment is determined based on the third moment, the first duration, and the second duration. The third moment is obtained by the UPF based on the first information. The first duration is obtained by the UPF based on the first information. The second duration is obtained by the UPF based on the fourth information.

Specifically, the first moment may be determined according to the following formula:

$$\text{First moment} = \text{first duration} + \text{second duration} + \text{third moment}.$$

The UPF may send the first packet when local time is the first moment. Alternatively, after receiving the first packet at a second moment, the UPF may send the first packet to the second UE after (first duration+second duration−(second moment−third moment)). The UPF determines the second moment when receiving the first packet.

Figure 10:
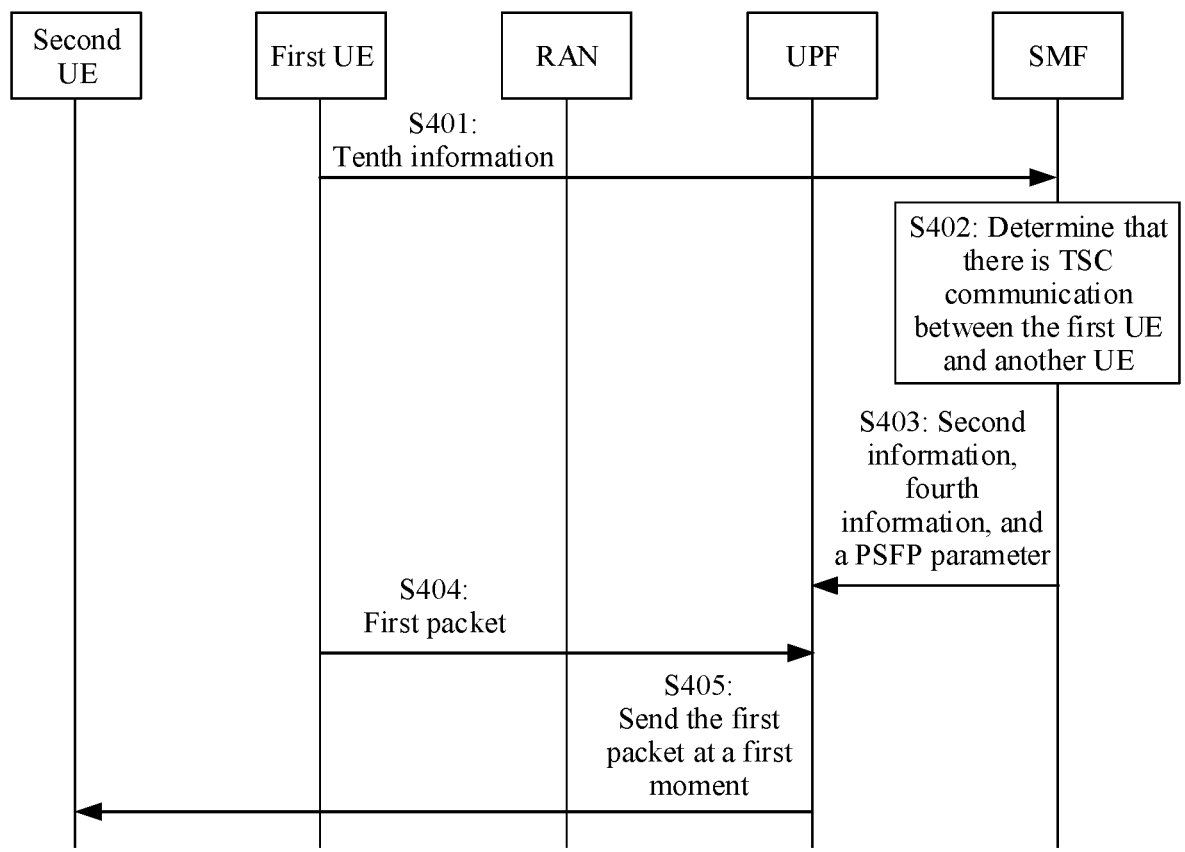
FIG. 10 is a schematic flowchart of another communication method, according to an embodiment of this application.

For example, as shown in FIG. 10, a communication method provided in this embodiment of this application may include the following steps.

S401: First UE sends tenth information to an SMF in a process of establishing a PDU session.

The tenth information indicates the first duration.

S402: The SMF determines that there is TSC communication between the first UE and another UE (for example, second UE).

The SMF may determine that the first UE sends a TSC packet to the second UE by using the PDU session.

S403: The SMF sends second information, fourth information, and a PSFP parameter to a UPF.

The second information indicates the first duration. The fourth information indicates a the second duration. The PSFP parameter is used to determine a third moment.

S404: The first UE sends the first packet to the UPF.

Correspondingly, the UPF receives the first packet.

S405: The UPF sends the first packet to the second UE at a first moment.

The first moment is determined based on the third moment, the first duration, and the second duration. The third moment is determined by the UPF based on the PSFP parameter. The first duration is obtained by the UPF based on the second information. The second duration is obtained by the UPF based on the fourth information.

Specifically, the first moment may be determined according to the following formula:

$$\text{First moment} = \text{first duration} + \text{second duration} + \text{third moment}.$$

The UPF may send the first packet when local time is the first moment. Alternatively, after receiving the first packet at a second moment, the UPF may send the first packet to the second UE after (first duration+second duration−(second moment−third moment)). The UPF determines the second moment when receiving the first packet.

Figure 11:
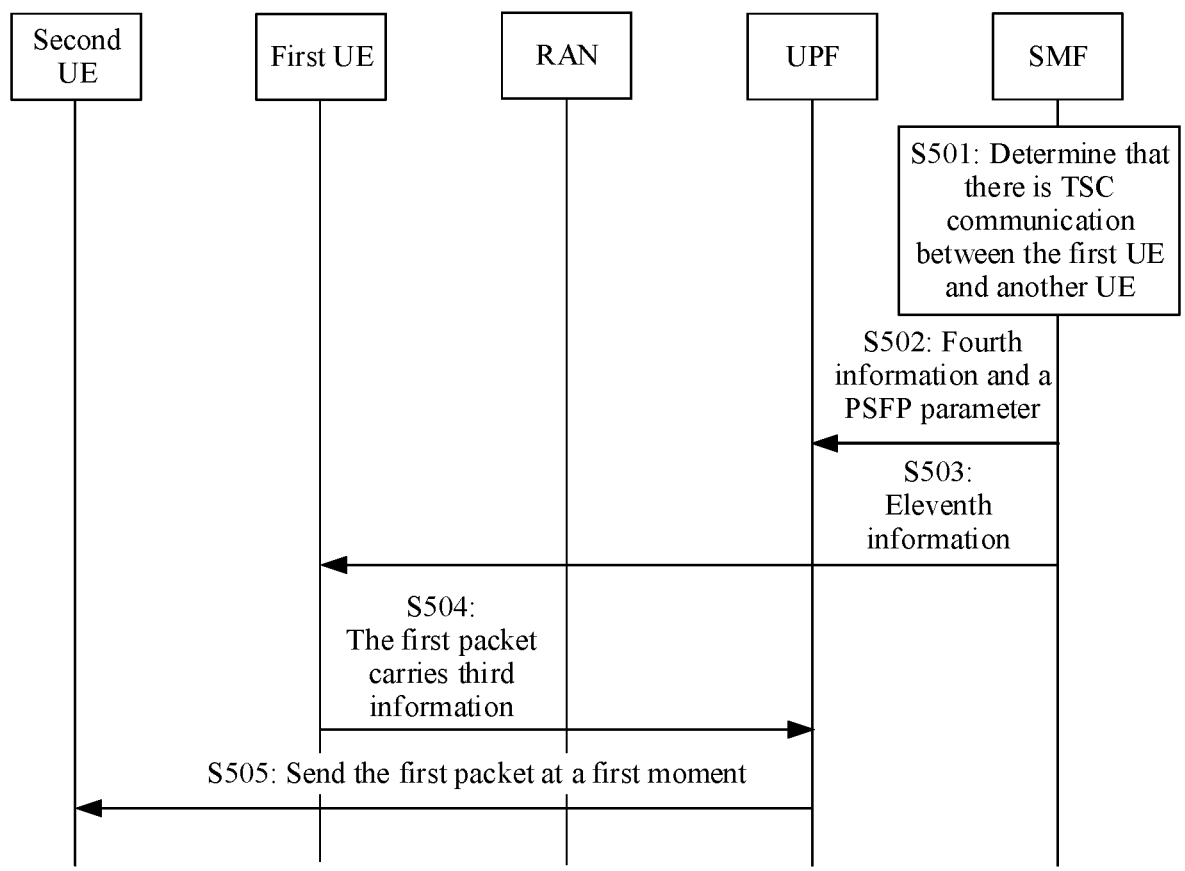
FIG. 11 is a schematic flowchart of another communication method, according to an embodiment of this application.

For example, as shown in FIG. 11, a communication method provided in this embodiment of this application may include the following steps.

S501: An SMF determines that there is TSC communication between first UE and another UE (for example, second UE).

The SMF may determine that the first UE sends a TSC packet to the second UE by using a PDU session.

S502: The SMF sends fourth information and a PSFP parameter to a UPF.

The fourth information indicates second duration. The PSFP parameter is used to determine a third moment.

S503: The SMF sends eleventh information to the first UE.

The eleventh information includes information about the PDU session, for example, a PDU session identifier, a QFI, a MAC address, or a VLAN ID.

The eleventh information may be carried in a PDU session modification message sent by the SMF to the first UE.

S504: The first UE sends a first packet to the UPF. The first packet carries third information.

The third information indicates the third moment and first duration. The first UE may carry the third information in the first packet based on the eleventh information.

Correspondingly, the UPF receives the first packet.

S505: The UPF sends the first packet to the second UE at a first moment.

The first moment is determined based on the third moment, the first duration, and the second duration. The third moment is determined by the UPF based on the PSFP parameter. The first duration is obtained by the UPF based on third information. The second duration is obtained by the UPF based on the fourth information.

Specifically, the first moment may be determined according to the following formula:

First moment=first duration+second duration+third moment.

The UPF may send the first packet when local time is the first moment. Alternatively, after receiving the first packet at a second moment, the UPF may send the first packet to the second UE after (first duration+second duration−(second moment−third moment)). The UPF determines the second moment when receiving the first packet.

Figure 12:
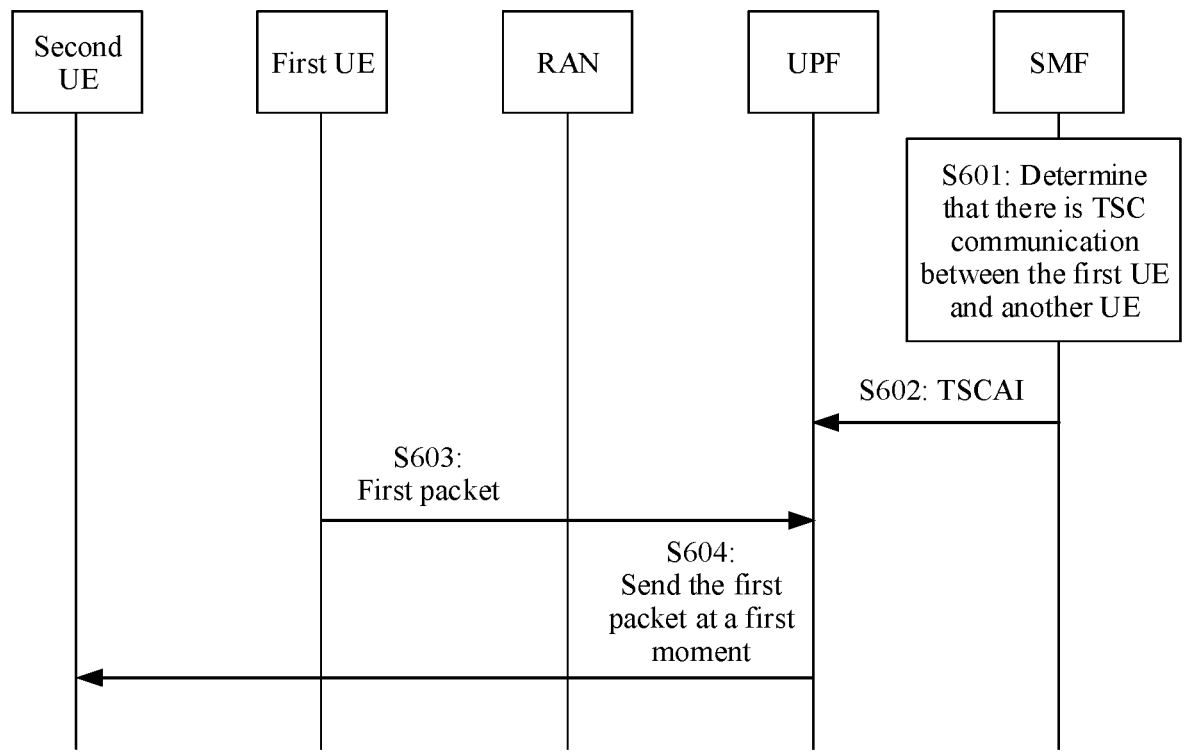
FIG. 12 is a schematic flowchart of another communication method, according to an embodiment of this application.

For example, as shown in FIG. 12, a communication method provided in this embodiment of this application may include the following steps.

S601: An SMF determines that there is TSC communication between first UE and another UE (for example, second UE).

The SMF may determine that the first UE sends a TSC packet to the second UE by using a PDU session.

S602: The SMF sends time sensitive communication assistance information TSCAI and fourth information to a UPF.

The TSCAI indicates a fourth moment and a first period. The fourth information indicates second duration.

S603: The first UE sends a first packet to the UPF.

Correspondingly, the UPF receives the first packet.

S604: The UPF sends the first packet to the second UE at a first moment.

The first moment is determined based on the fourth moment and the second duration. The fourth moment is obtained based on the TSCAI.

Specifically, the first moment may be determined according to the following formula:

First moment=second duration+fourth moment.

In the foregoing embodiments provided in this application, the method and the method procedure provided in embodiments of this application are described from a perspective of functions implemented by the UPF, the first UE, and the SMF. To implement functions in the method provided in embodiments of this application, the UPF, the first UE (or referred to as first user equipment) and the SMF each may include a hardware structure and/or a software module, to implement the functions in a form of a hardware structure, a software module, or a combination of the hardware structure and the software module. Whether a function in the foregoing functions is performed by using the hardware structure, the software module, or the combination of the hardware structure and the software module depends on particular applications and design constraints of the technical solutions.

Figure 13:
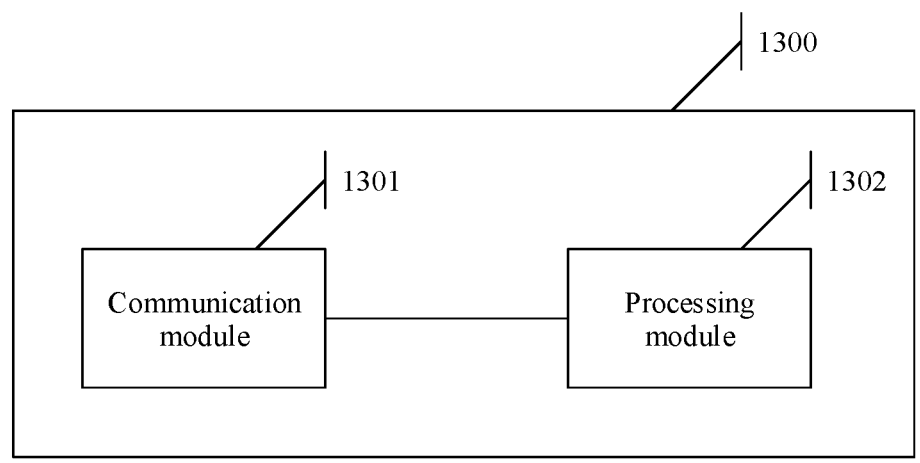
FIG. 13 is a schematic diagram of a structure of a communication apparatus, according to an embodiment of this application.

As shown in FIG. 13, a communication apparatus provided in an embodiment of this application may include a communication module 1301 and a processing module 1302. The communication module 1301 and the processing module 1302 are coupled to each other. The communication apparatus 1300 may be configured to perform the steps performed by the UPF, the first UE, or the SMF shown in FIG. 5 and FIG. 8 to FIG. 12. The communication module 1301 may be configured to support the communication apparatus 1300 in communication. The communication module 1301 may also be referred to as a communication unit, a communication interface, a transceiver module, or a transceiver unit. The communication module 1301 may have a wireless communication function, for example, can communicate with another communication apparatus in a wireless communication manner. The processing module 1302 may also be referred to as a processing unit, and may be configured to support the communication apparatus 1300 in performing a processing action of the session management network element in the foregoing method embodiments, including but not limited to: generating information and a message that are sent by the communication module 1301, and/or demodulating and decoding a signal received by the communication module 1301.

Specifically, when performing the steps performed by the UPF in the foregoing method embodiments, the communication module 1301 may be configured to receive a first packet of a first data stream from the first UE. A transmit end of a packet of the first data stream is the first UE, and a receive end of the packet of the first data stream is second user equipment. The communication module 1301 is configured to send the first packet to the second user equipment at a first moment. The first moment is associated with a third moment, first duration, and second duration, or the first moment is associated with a fourth moment and the second duration.

Specifically, the processing module 1302 may determine fourth duration based on the first moment and a second moment. The communication module 1301 may send the first packet to the second UE after the fourth duration expires after the second moment. The fourth duration is associated with the first duration, the second duration, the second moment, and the third moment.

For manners of respectively setting the second moment, the third moment, the first duration, the second duration, and the fourth moment, refer to the foregoing descriptions. Details are not described herein again.

In a possible design, the first packet may include first information. The first information indicates the third moment, or indicates the third moment and the first duration, or indicates a fifth moment. The fifth moment is associated with the third moment and the first duration. It should be understood that the fifth moment may be a moment at which the first packet arrives at an egress port of the first UE.

In a possible design, the communication module 1301 may further receive a PSFP parameter from the SMF. The UPF may further determine the third moment based on the PSFP parameter.

In a possible design, the communication module 1301 may receive second information from the SMF. The second information indicates the first duration and/or the third moment.

In a possible design, the first packet may include third information. The third information may indicate the first duration.

In a possible design, the communication module 1301 may receive fourth information from the SMF. The fourth information may indicate the second duration.

In a possible design, the communication module 1301 may receive fifth information from the SMF. The fifth information may indicate third duration. The processing module 1302 may determine the first moment based on the third moment and the third duration.

In a possible design, the third duration is a sum of the first duration and the second duration.

In a possible design, the communication module 1301 may receive sixth information from the SMF. The sixth information may indicate the fourth moment.

In a possible design, the communication module 1301 may receive seventh information from the SMF. The seventh information indicates a first period. The first period is a period in which the first packet is sent from the first UE. Alternatively, the first period is a time period between start moments of two packets.

In a possible design, the communication module 1301 may receive time sensitive communication assistance information and the fourth information from the SMF. The time sensitive communication assistance information may indicate the fourth moment and the first period. The fourth information indicates the second duration.

In a possible design, the communication module 1301 may receive eighth information from the SMF. The eighth information indicates the fifth moment, and the fifth moment is associated with the third moment and the first duration. It should be understood that the fifth moment may be the moment at which the first packet arrives at the egress port of the first UE.

In a possible design, the communication module 1301 may receive ninth information from the SMF. The ninth information indicates the first moment.

When performing the steps performed by the first UE in the foregoing method embodiments, in a possible implementation, the communication module 1301 may be configured to send the first packet to the UPF. The first packet includes the first information or the third information.

The first information indicates the third moment. The third moment is a moment at which the first packet arrives at an ingress port of the first UE. The first information indicates the third moment and the first duration. The first duration is residence time of the first packet on the first UE and a DS-TT.

Alternatively, the first information indicates the fifth moment. The fifth moment is associated with the third moment and the first duration. It should be understood that the fifth moment may be the moment at which the first packet arrives at the egress port of the first UE.

The third information indicates the first duration.

In a possible design, if the first information indicates the third moment, the communication module 1301 may send tenth information to the SMF. The tenth information indicates the first duration and/or the third moment.

In a possible design, the communication module 1301 may receive eleventh information from the SMF. The eleventh information includes information about a protocol data unit PDU session corresponding to the first packet.

In a possible design, the information about the PDU session includes at least one of a PDU session identifier, a QoS flow identifier, a MAC address, or a VLAN ID.

When performing the steps performed by the first UE in the method embodiment shown in FIG. 10, the communication module 1301 may be configured to send the tenth information to the SMF. The tenth information indicates the first duration and/or the third moment.

When performing the steps performed by the first UE in the foregoing method embodiments, the communication module 1301 may be configured to send at least one of the PSFP parameter, the second information, the fourth information, the fifth information, the sixth information, the seventh information, the time sensitive communication assistance information, the eighth information, or the ninth information to the UPF.

The PSFP parameter is used to determine the third moment. The third moment is the moment at which the first packet arrives at the ingress port of the first UE.

The second information indicates the first duration. The first duration is the residence time of the first packet on the first UE and the device side TSN translator.

The fourth information indicates the second duration. The second duration is a packet delay budget corresponding to this uplink PDU session.

The fifth information indicates the third duration. The third duration is the sum of the first duration and the second duration.

The sixth information indicates the fourth moment. The fourth moment is the moment at which the first packet arrives at the egress port of the first UE.

The seventh information indicates the first period. The first period is the period in which the first packet is sent from the first UE. Alternatively, the first period is the time period between the start moments of the two packets.

The eighth information indicates the fifth moment. The fifth moment is associated with the third moment and the first duration. It should be understood that the fifth moment may be the moment at which the first packet arrives at the egress port of the first UE.

The ninth information indicates the first moment. The first moment is associated with the third moment, the first duration, and the second duration, or the first moment is associated with the third moment and the third duration, or the first moment is associated with the fourth moment and the second duration.

In a possible design, before sending the at least one piece of the second information, the fifth information, and the ninth information to the UPF, the communication module 1301 may receive the tenth information from the first UE. The tenth information indicates the first duration and/or the third moment.

In a possible design, the processing module 1302 may determine that the first packet is sent by the first UE to the second user equipment. The communication module 1301 may send the eleventh information to the first UE. The eleventh information includes the information about the PDU session corresponding to the first packet.

In a possible design, the information about the PDU session includes at least one of the PDU session identifier, the QFI, the MAC address, or the VLAN ID of the PDU session.

In a possible design, before the communication module 1301 sends the ninth information, the processing module 1302 may determine the first moment based on the third moment, the first duration, and the second duration, or based on the third moment and the third duration, or based on the fourth moment and the second duration.

In another possible implementation, the communication apparatus provided in this embodiment of this application may alternatively include a hardware component, for example, a processor, a memory, or a transceiver, to implement functions of the UPF, the first UE or the SMF in this application.

Figure 14:
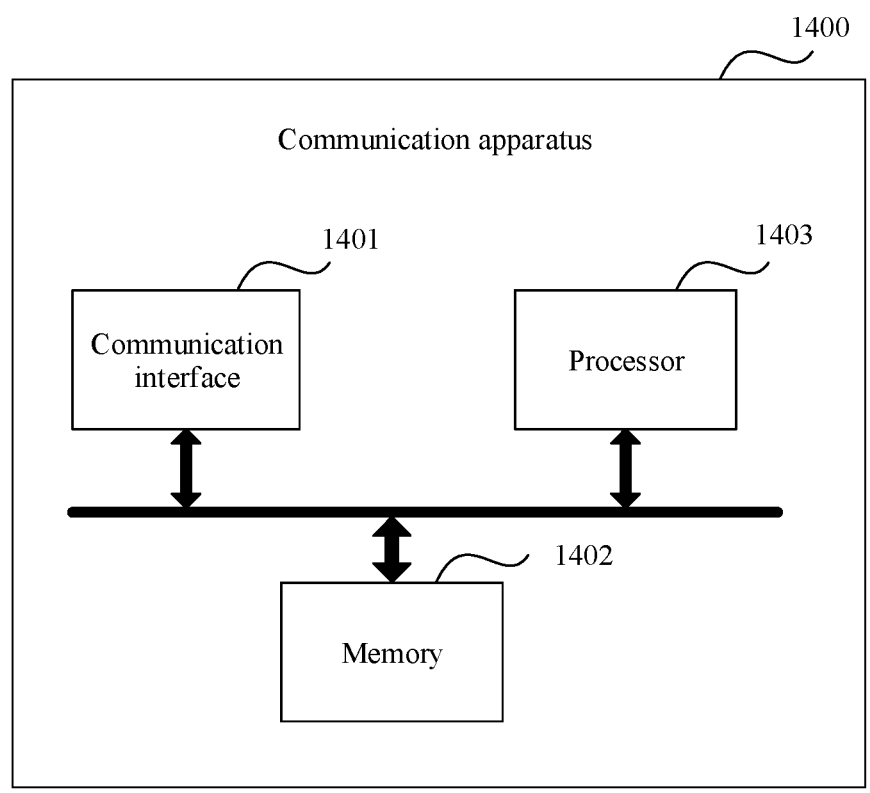
FIG. 14 is a schematic diagram of a structure of another communication apparatus, according to an embodiment of this application.

For ease of understanding, FIG. 14 shows only a structure necessary for a communication apparatus 1400 to perform the method shown in this application, and no limitation is imposed on that the communication apparatus may have more components in this application. The communication apparatus 1400 may be configured to perform the steps performed by the UPF or the SMF in the foregoing method embodiments. The communication apparatus 1400 may include a communication interface 1401, a memory 1402, and a processor 1403. The communication interface 1401 may be used by the communication apparatus to perform communication, for example, to send or receive a signal. The memory 1402 is coupled to the processor 1403, and may be configured to store a program and data that are necessary for implementing functions of the communication apparatus 1400. The processor 1403 is configured to support the communication apparatus 1400 in performing a processing function performed by the UPF or the SMF in the foregoing methods, for example, determining to generate information and a message that are sent by the communication interface 1401, and/or demodulating and decoding a signal received by the communication interface 1401. The memory 1402 and the processor 1403 may be integrated or may be independent of each other.

For example, the communication interface 1401 may be a communication port, for example, a communication port (or referred to as an interface) used for communication between network elements. The communication interface 1401 may also be referred to as a transceiver unit or a communication unit. The processor 1403 may be implemented by using a processing chip or a processing circuit.

Specifically, when the steps performed by the UPF or the SMF in FIG. 5 and FIG. 8 to FIG. 12 in the foregoing method embodiments are performed, the communication interface 1401 may be configured to perform the steps performed by the communication module 1301. The processor 1403 may be configured to perform the foregoing steps performed by the processing module 1302. Details are not described herein again.

Figure 15:
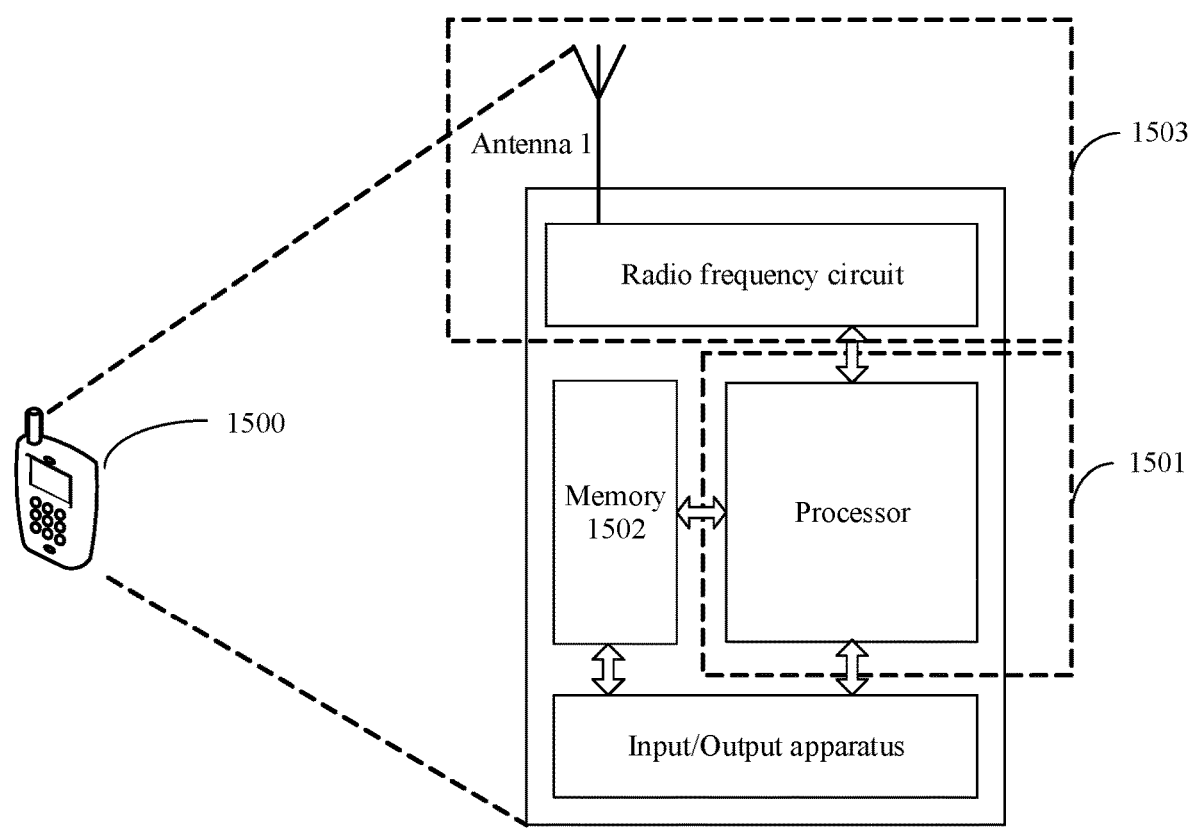
FIG. 15 is a schematic diagram of a structure of another communication apparatus, according to an embodiment of this application.

In FIG. 15, a mobile phone is used as an example to describe a possible structure of a first communication apparatus 1500. As shown in FIG. 15, the communication apparatus 1500 may include a processor 1501, a memory 1502, and a transceiver 1503.

The processor 1501 may be configured to: process a communication protocol and communication data, control the first communication apparatus, execute a software program, process data of the software program, and the like. The memory 1502 may be configured to store the program and data, and the processor 1501 may perform, based on the program, the method performed by the first communication apparatus in embodiments of this application.

The transceiver 1503 may include a radio frequency unit and an antenna. The radio frequency unit may be configured to perform conversion between a baseband signal and a radio frequency signal, and process the radio frequency signal. The antenna may be configured to receive and send a radio frequency signal in a form of an electromagnetic wave. In addition, only the radio frequency unit may be considered as the transceiver 1503. In this case, the communication apparatus 1500 may include the processor 1501, the memory 1502, the transceiver 1503, and an antenna.

In addition, the communication apparatus 1500 may further include an input/output apparatus, for example, a touchscreen, a display screen, a keyboard, or another component that may be configured to receive data input by a user and output data to the user. It should be noted that some types of communication apparatuses may have no input/output apparatus.

Based on the structure shown in FIG. 15, when the communication apparatus 1500 needs to send data, the processor 1501 may perform baseband processing on to-be-sent data, and output a baseband signal to the radio frequency unit. The radio frequency unit performs radio frequency processing on the baseband signal, and then sends a radio frequency signal in a form of an electromagnetic wave through the antenna. When data is sent to the communication apparatus 1500, the radio frequency unit receives the radio frequency signal through the antenna, converts the radio frequency signal into a baseband signal, and outputs the baseband signal to the processor 1501. The processor 1501 converts the baseband signal into data and processes the data.

For example, the processor 1501 may be configured to perform the steps performed by the processing module 1302 shown in FIG. 13. The transceiver 1503 may be configured to perform the steps performed by the communication module 1301 shown in FIG. 13.

In addition, based on an actual use requirement, the communication apparatus provided in embodiments of this application may include a processor, and the processor invokes an external transceiver and/or memory to implement the foregoing functions, steps, or operations. The communication apparatus may further include a memory, and the processor invokes and executes a program stored in the memory, to implement the foregoing functions, steps, or operations. Alternatively, the communication apparatus may include a processor and a transceiver (or a communication interface), and the processor invokes and executes a program stored in an external memory, to implement the foregoing functions, steps, or operations. Alternatively, the communication apparatus may include a processor, a memory, and a transceiver.

Based on a same concept as that of the foregoing method embodiments, an embodiment of this application further provides a computer-readable storage medium. The computer-readable storage medium stores program instructions (or referred to as a computer program or instructions). When the program instructions are executed by a processor, a computer is enabled to perform the operation performed by the UPF, the first UE, or the SMF in any one of the foregoing method embodiments and the possible implementations of the foregoing method embodiments.

Based on a same concept as that of the foregoing method embodiments, an embodiment of this application further provides a communication method. The communication method may be performed by a UPF, first UE, and an SMF. Specifically, the method may include the method shown in any one of FIG. 5 and FIG. 8 to FIG. 12.

Based on a same concept as that of the foregoing method embodiments, this application further provides a computer program product, including program instructions. When the computer program product is invoked and executed by a computer, the computer may be enabled to implement the operation performed by the UPF, the first UE, or the SMF in any one of the foregoing method embodiments and the possible implementations of the foregoing method embodiments.

Based on a same concept as that of the foregoing method embodiments, this application further provides a chip or a chip system. The chip is coupled to a transceiver, and is configured to implement the operation performed by the UPF, the first UE, or the SMF in any one of the foregoing method embodiments and the possible implementations of the foregoing method embodiments. The chip system may include the chip and components such as a memory and a communication interface.

Based on a same concept as that of the foregoing method embodiments, this application further provides a communication system. The communication system may be configured to implement the operation performed by the UPF, the first UE, or the SMF in any one of the foregoing method embodiments and the possible implementations of the foregoing method embodiments. For example, the communication system has the architecture shown in FIG. 1.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, comprising:
    receiving, by a user plane function (UPF), a first packet of a first data stream from a first user equipment (UE), wherein a transmit end of packets of the first data stream is the first UE, and a receive end of packets of the first data stream is a second UE; and
    sending, by the UPF, the first packet to the second user equipment at a first moment, wherein:
    the first moment is associated with a third moment, a first duration, and a second duration, the third moment is a moment at which the first packet arrives at an ingress port of the first UE, the first duration is a residence time of the first packet on the first UE and a device side time sensitive network (TSN) translator, and the second duration is a packet delay budget corresponding to an uplink protocol data unit (PDU) session of the first packet; or
    the first moment is associated with a fourth moment and the second duration, and the fourth moment is a moment at which the first packet arrives at an egress port of the first UE.

2. The method according to claim 1, wherein the sending, by the UPF, the first packet to the second UE at the first moment comprises:
    after receiving the first packet, sending, by the UPF, the first packet to the second UE after a fourth duration, wherein the fourth duration is associated with the first duration, the second duration, the third moment, and a second moment, and the second moment is a moment at which the UPF receives the first packet.

3. The method according to claim 1, wherein the first packet comprises first information; and wherein:
    the first information indicates the third moment;
    the first information indicates the third moment and the first duration; or
    the first information indicates a fifth moment, and the fifth moment is associated with the third moment and the first duration.

4. The method according to claim 1, wherein the method further comprises:
    receiving, by the UPF, a per-stream filtering and policing (PSFP) parameter from a session management function (SMF); and
    determining, by the UPF, the third moment based on the PSFP parameter.

5. The method according to claim 4, wherein the method further comprises:
    receiving, by the UPF, second information from the SMF, wherein the second information indicates the first duration.

6. The method according to claim 4, wherein the method further comprises:
    receiving, by the UPF, fourth information from the SMF, wherein the fourth information indicates the second duration.

7. The method according to claim 4, wherein the method further comprises:
    receiving, by the UPF, fifth information from the SMF, wherein the fifth information indicates a third duration; and
    determining, by the UPF, the first moment based on the third moment and the third duration.

8. The method according to claim 1, wherein the first packet comprises third information, and the third information indicates the first duration.

9. The method according to claim 1, wherein the method further comprises:
    receiving, by the UPF, sixth information from a session management function (SMF), wherein the sixth information indicates the fourth moment.

10. The method according to claim 1, wherein the method further comprises:

receiving, by the UPF, time sensitive communication assistance information and fourth information from a session management function (SMF), wherein the fourth information indicates the second duration.

11. The method according to claim 1, wherein the method further comprises:
receiving, by the UPF, eighth information from a session management function (SMF), wherein the eighth information indicates a fifth moment, and the fifth moment is associated with the third moment and the first duration.

12. The method according to claim 1, wherein the method further comprises:
receiving, by the UPF, ninth information from a session management function (SMF), wherein the ninth information indicates the first moment.

13. A communication apparatus, comprising at least one processor, wherein the at least one processor is coupled to a memory, the memory is configured to store a program or instructions, and when the program or the instructions are executed by the at least one processor, the communication apparatus is enabled to perform the following method:
receiving a first packet of a first data stream from a first user equipment (UE), wherein a transmit end of packets of the first data stream is the first user equipment, and a receive end of packets of the first data stream is a second UE; and
sending the first packet to the second UE at a first moment, wherein:
the first moment is associated with a third moment, a first duration, and a second duration, the third moment is a moment at which the first packet arrives at an ingress port of the first UE, the first duration is a residence time of the first packet on the first UE and a device side time sensitive network (TSN) translator, and the second duration is a packet delay budget corresponding to an uplink protocol data unit (PDU) session of the first packet; or
the first moment is associated with a fourth moment and the second duration, and the fourth moment is a moment at which the first packet arrives at an egress port of the first UE.

14. The communication apparatus according to claim 13, wherein the at least one processor is further configured to:
after receiving the first packet, send the first packet to the second UE after a fourth duration, wherein the fourth duration is associated with the first duration, the second duration, the third moment, and a second moment, and the second moment is a moment at which the communication apparatus receives the first packet.

15. The communication apparatus according to claim 13, wherein the first packet comprises first information; and wherein:
the first information indicates the third moment; or
the first information indicates the third moment and the first duration; or
the first information indicates a fifth moment, and the fifth moment is associated with the third moment and the first duration.

16. The communication apparatus according to claim 13, wherein the at least one processor is further configured to:
receive a per-stream filtering and policing (PSFP) parameter from a session management function (SMF); and
determine the third moment based on the PSFP parameter.

* * * * *